United States Patent [19]
Okuda et al.

[11] Patent Number: 5,593,187
[45] Date of Patent: Jan. 14, 1997

[54] PIPE JOINT

[75] Inventors: Nobuyuki Okuda, Oyama; Koichi Inoue, Koga; Toshinori Tokutake; Shinji Ito, both of Oyama, all of Japan

[73] Assignee: Showa Aluminum Corporation, Osaka, Japan

[21] Appl. No.: 587,757

[22] Filed: Nov. 22, 1995

Related U.S. Application Data

[63] Continuation of Ser. No. 126,203, Sep. 24, 1993, abandoned.

[30] Foreign Application Priority Data

Sep. 24, 1992 [JP] Japan .................................. 4-254990
Dec. 10, 1992 [JP] Japan .................................. 4-330633

[51] Int. Cl.⁶ .................................................. F16L 37/08
[52] U.S. Cl. ...................... 285/305; 285/319; 285/914; 285/921; 285/38
[58] Field of Search .................................. 285/319, 305, 285/921, 914, 38

[56] References Cited

U.S. PATENT DOCUMENTS

| | | | |
|---|---|---|---|
| 3,314,696 | 4/1967 | Ferguson et al. | 285/305 X |
| 3,534,988 | 10/1970 | Lindsey | 285/305 |
| 3,628,768 | 12/1971 | Hutt | 285/305 X |
| 3,753,582 | 8/1973 | Graham | 285/305 |
| 4,244,608 | 1/1981 | Stuemky | 285/305 |
| 4,423,892 | 1/1984 | Bartholomew | 285/305 X |
| 4,813,716 | 3/1989 | Lalikos et al. | |
| 4,869,534 | 9/1989 | Ketcham et al. | 285/305 X |
| 5,154,450 | 10/1992 | Washizu | 285/921 X |
| 5,211,427 | 5/1993 | Washizu et al. | 285/305 X |

FOREIGN PATENT DOCUMENTS

| | | |
|---|---|---|
| 0488844 | 6/1992 | European Pat. Off. |
| 0530778 | 3/1993 | European Pat. Off. |
| 01398823 | 4/1965 | France. |
| 4142640 | 7/1992 | Germany. |

*Primary Examiner*—Dave W. Arola
*Attorney, Agent, or Firm*—Armstrong, Westerman, Hattori, McLeland & Naughton

[57] ABSTRACT

A pipe joint for joining two pipes end to end comprises a hollow cylindrical spigot portion having an annular projection on the outer periphery of a base end thereof, a hollow cylindrical socket portion having an inside diameter approximately equal to the outside diameter of the spigot portion and formed with two opposed apertures in its peripheral wall close to a forward end thereof and with a stepped part on the inner surface of the peripheral wall for the projection to come into contact with, the stepped part being closer to a base end of the socket portion than the apertures, and a stopper having a pair of circular-arc resilient legs fittable into the respective apertures from outside to project inward and each having a slanting inner surface, the legs being opposed to each other for the inwardly curved surfaces thereof to face each other. The projection is fixedly held between the stepped part and the legs by inserting the stopper into the apertures with the slanting surfaces facing toward the insertion side of the spigot portion and inserting the spigot portion into the socket portion until the projection moves past the legs. The spigot and socket portions are provided at the joint ends of the two respective pipes to be joined.

6 Claims, 18 Drawing Sheets

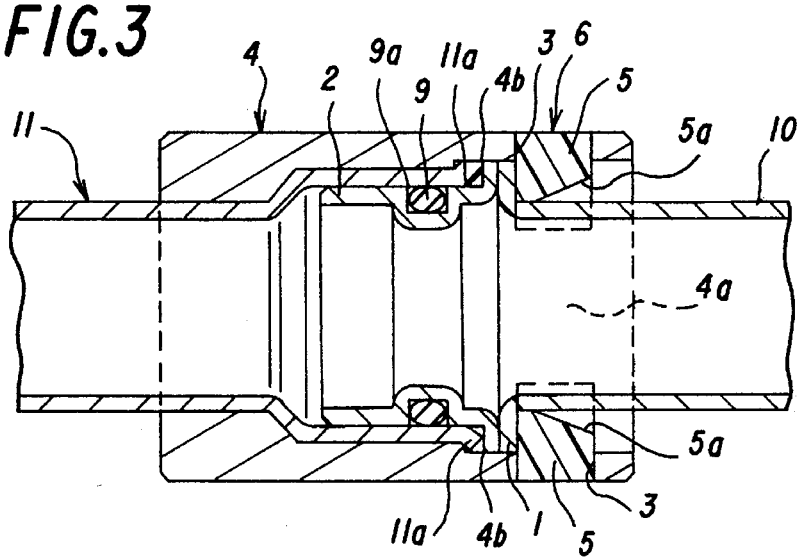
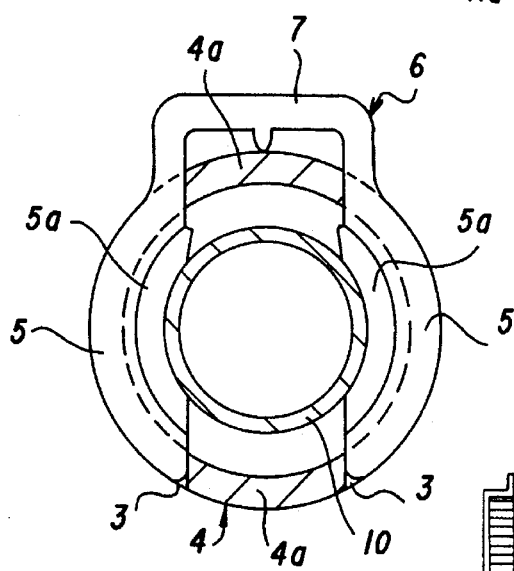
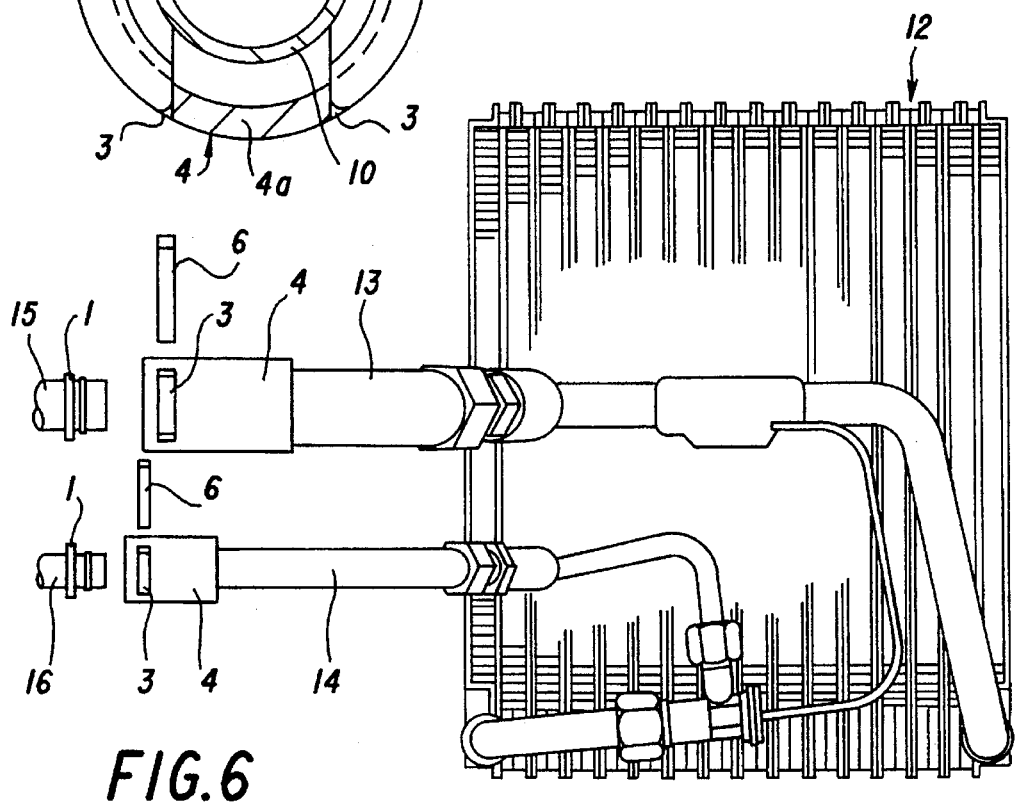

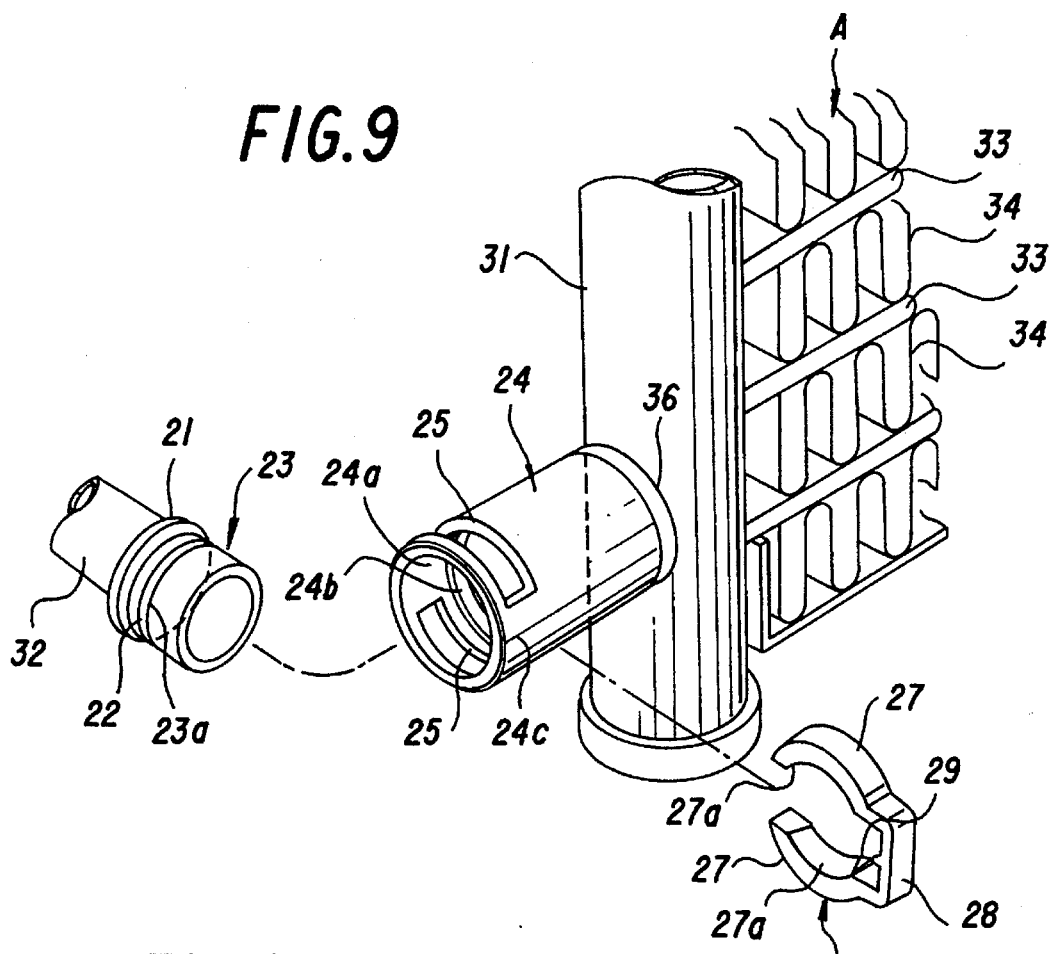
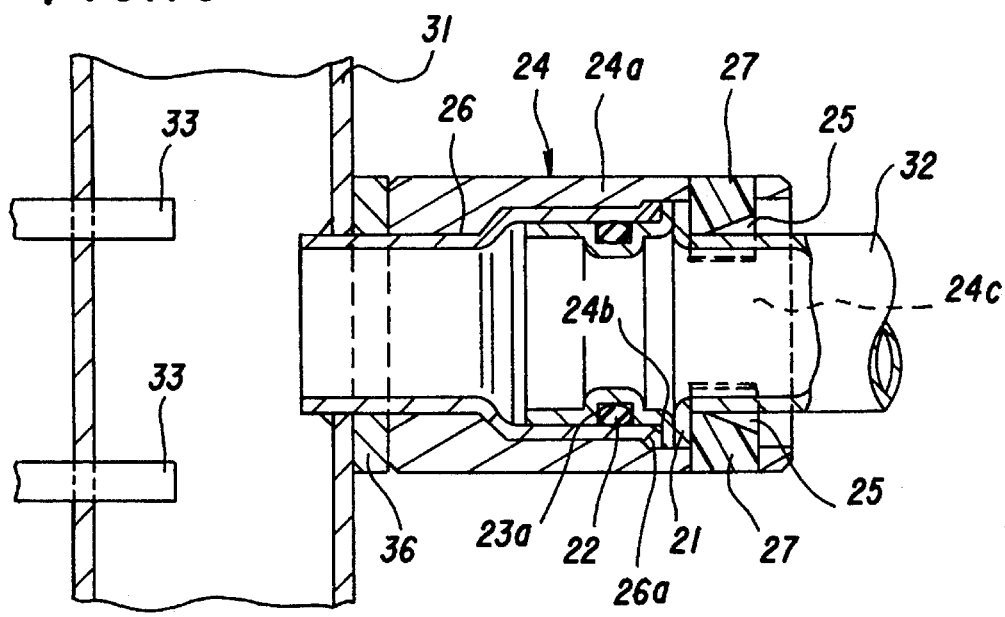

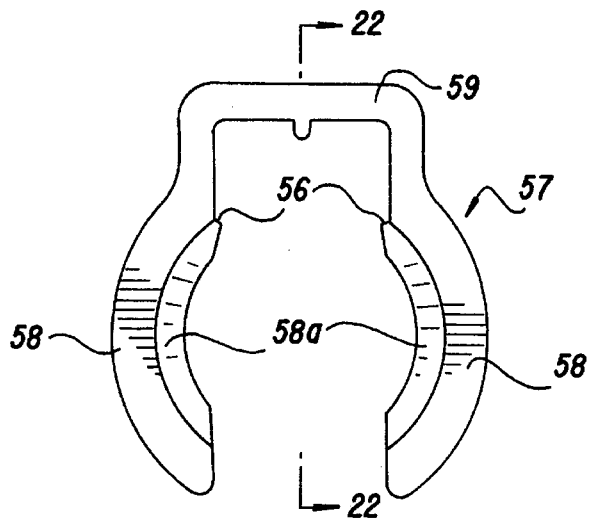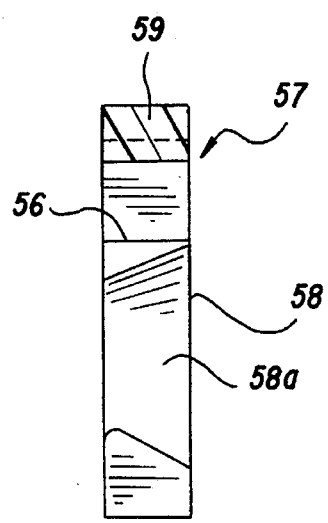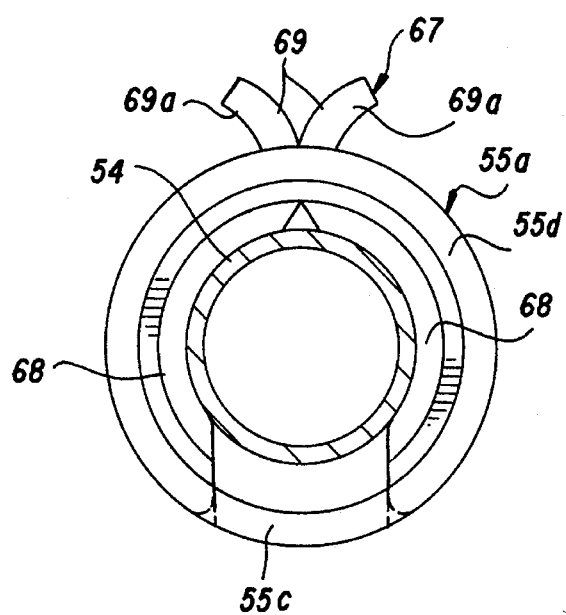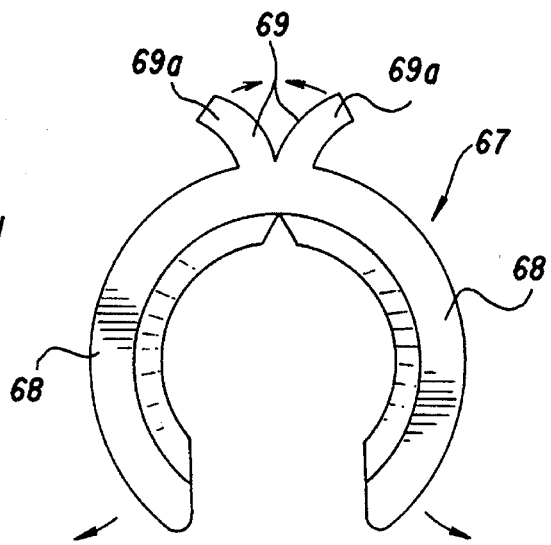

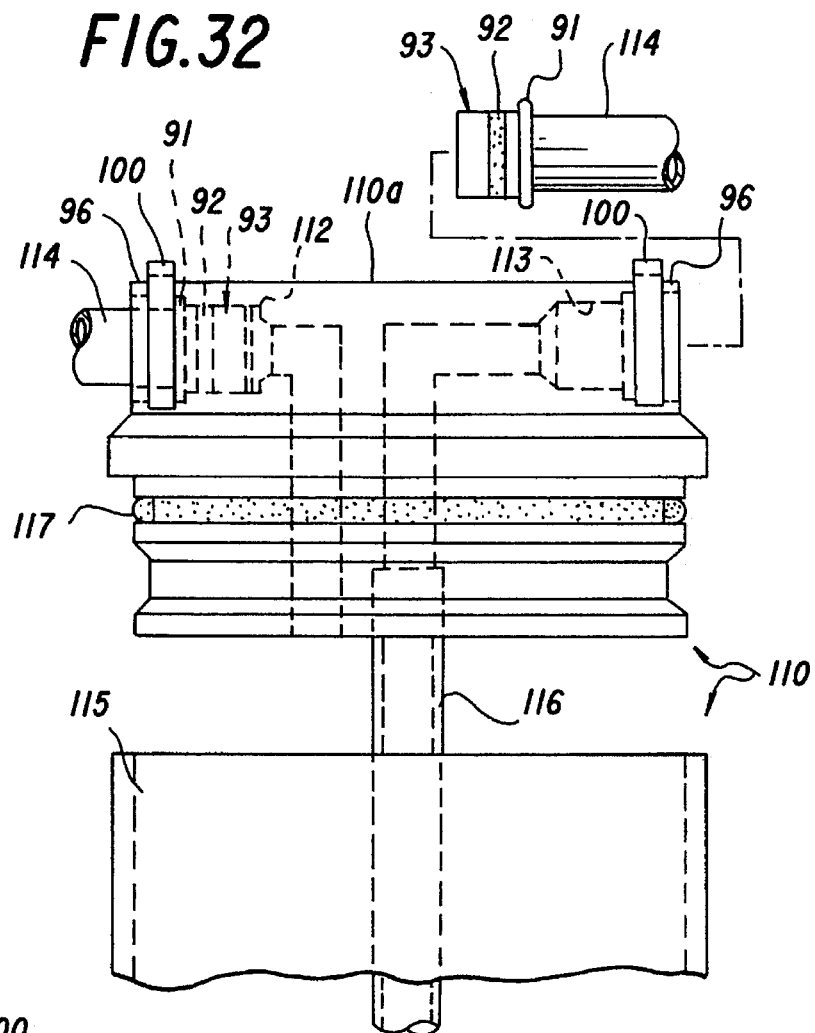
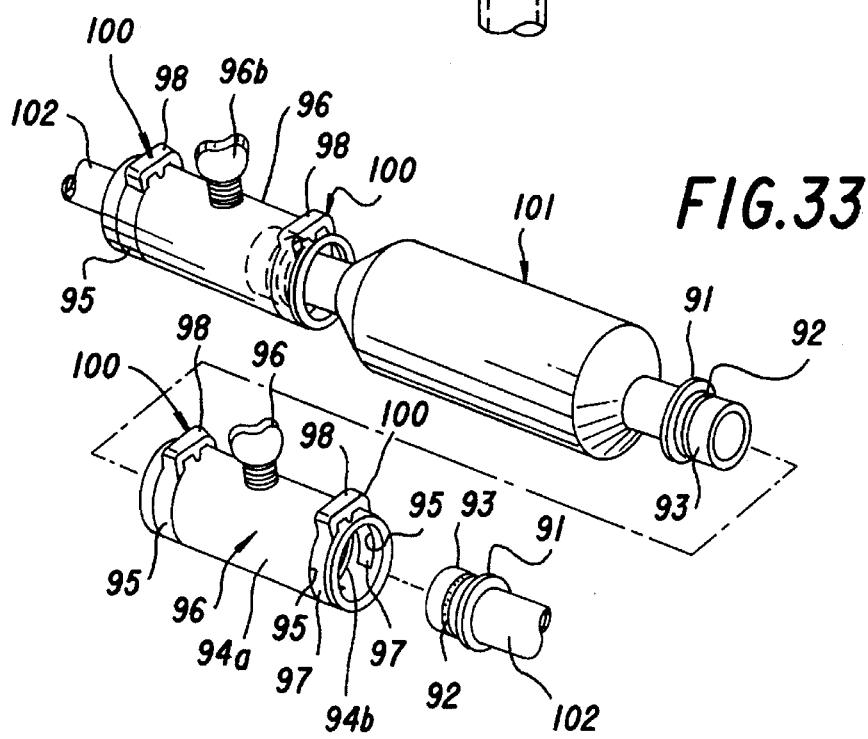

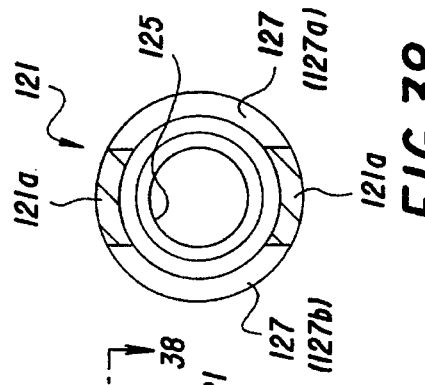
FIG.38
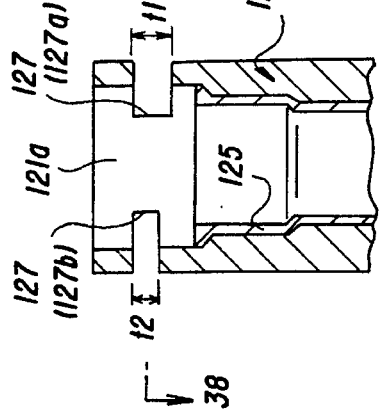
FIG.37
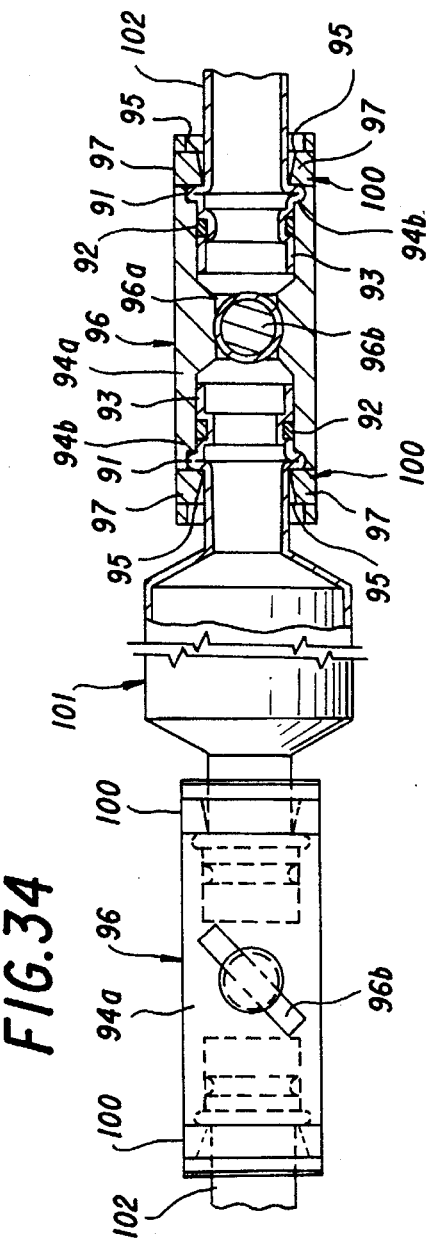
FIG.34
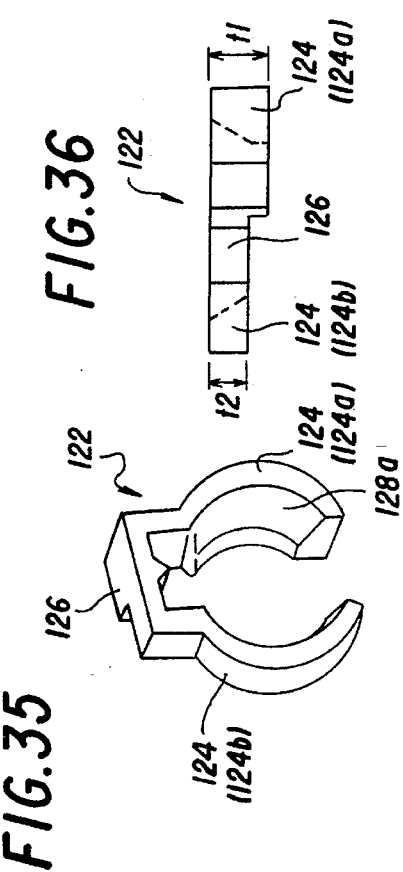
FIG.36
FIG.35

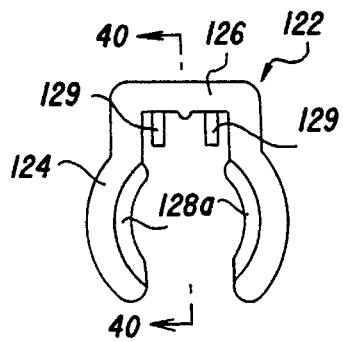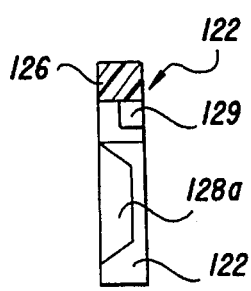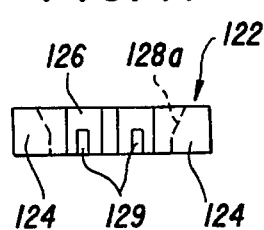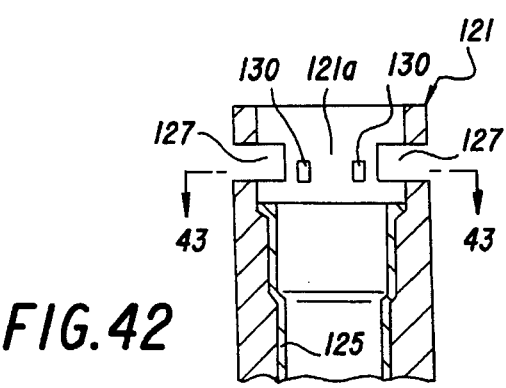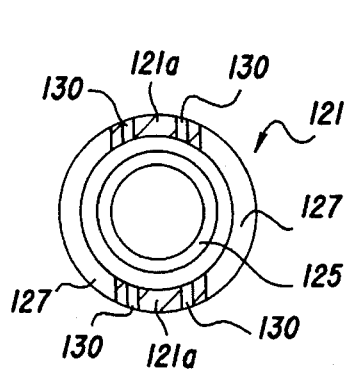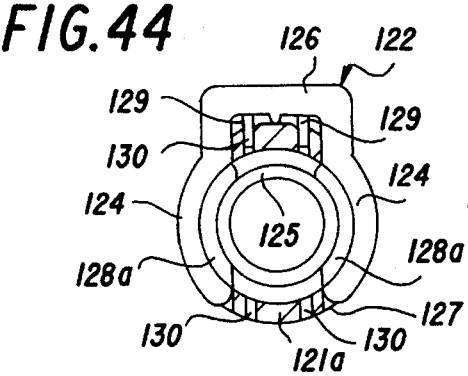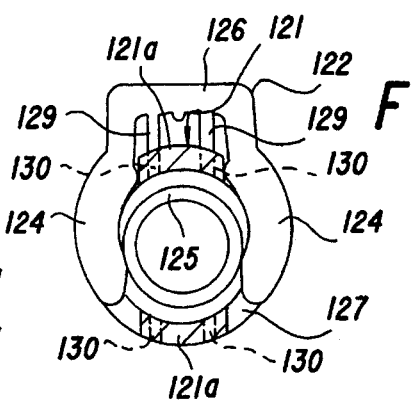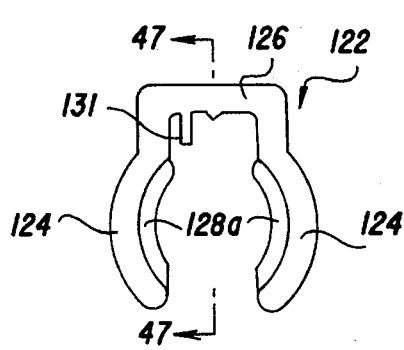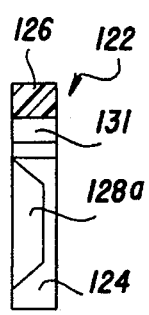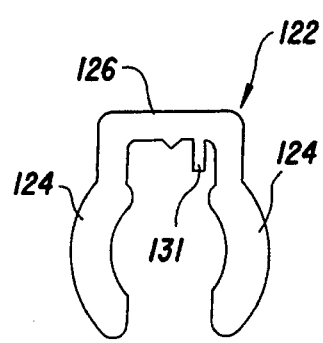

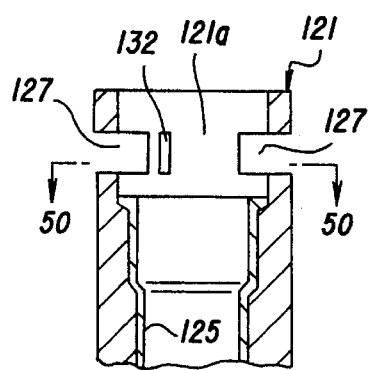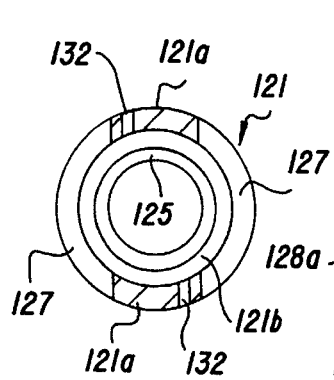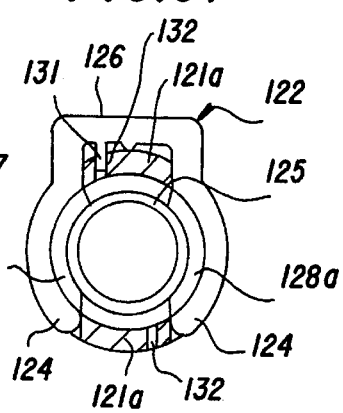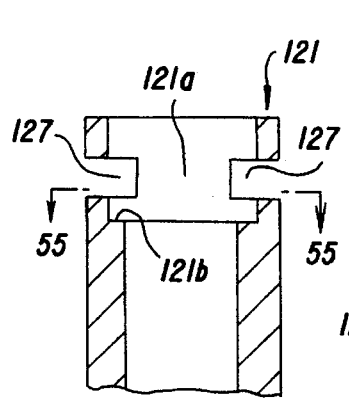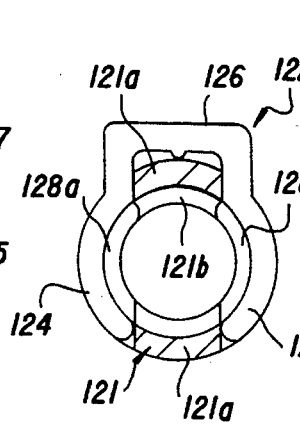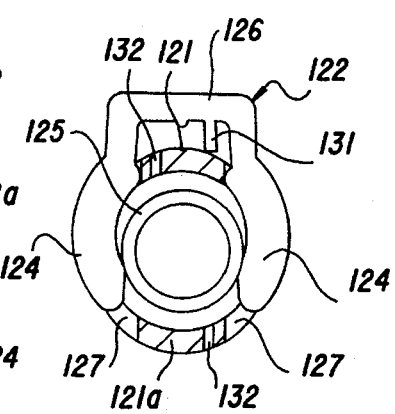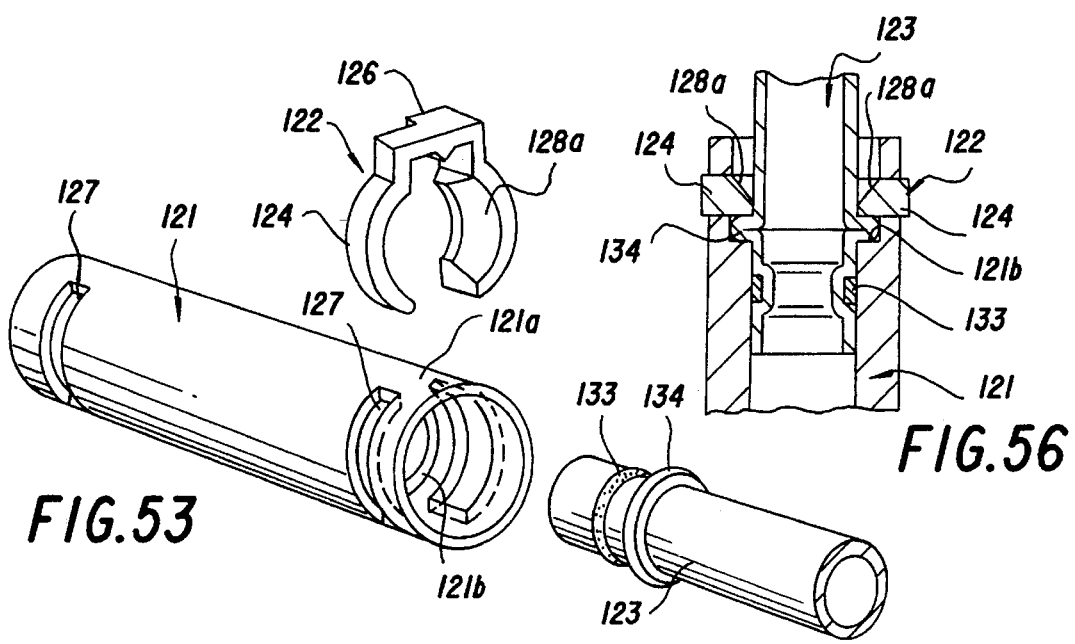

FIG.64 PRIOR ART
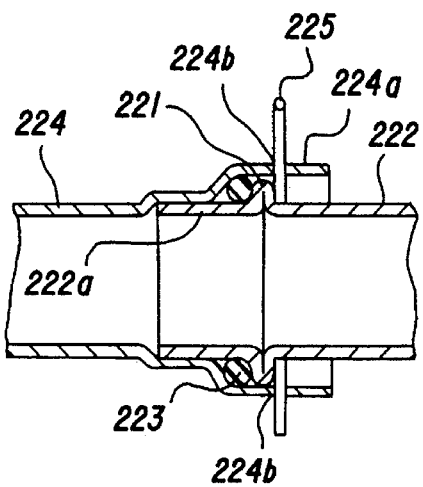
FIG.65 PRIOR ART
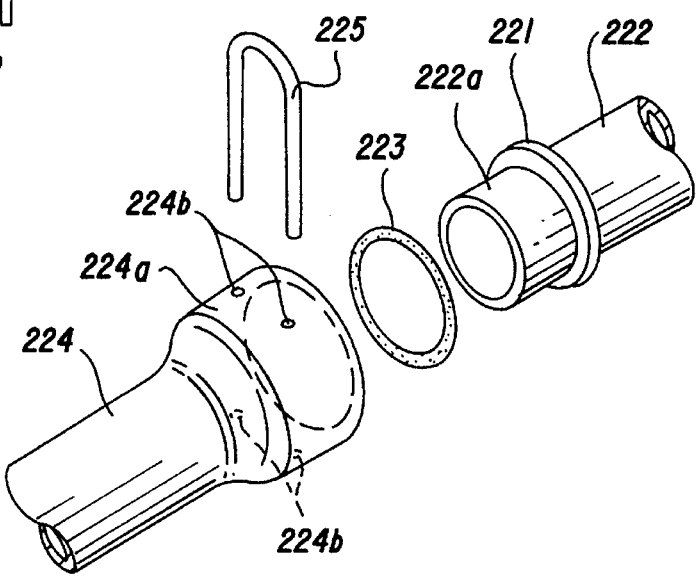
FIG.66 PRIOR ART
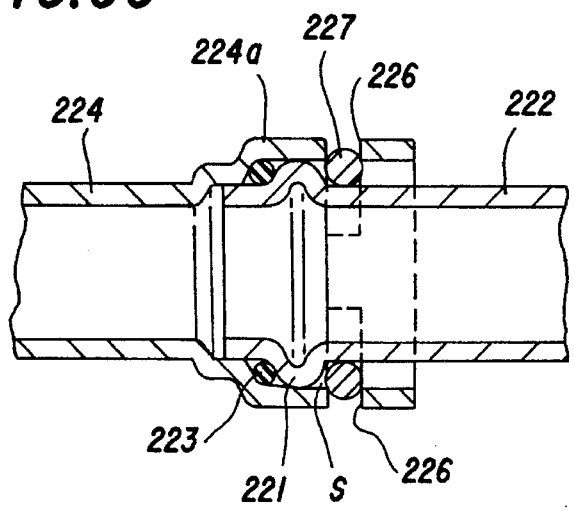
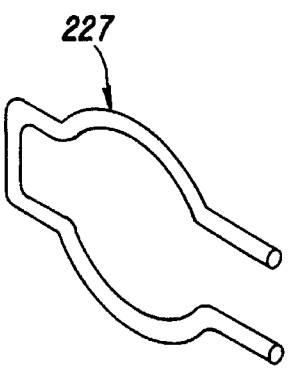
FIG.67 PRIOR ART

1

PIPE JOINT

This application is a continuation of application Ser. No. 08/126,203 filed Sep. 24, 1993, now abandoned.

BACKGROUND OF THE INVENTION

1. Field of the Invention

The present invention relateds to pipe joints for use in piping for heat exchangers, tanks, pressure containers, etc.

2. Description of the Prior Art

With reference to FIGS. 58 to 60, a pipe 170 has at an end thereof a housing 171 which is formed with a pair of upper and lower approximately square apertures 172 in each of its opposite sides. Another pipe 173 to be joined to the housing 171 has a tapered portion 174. Provided inside the housing 171 are a bush 175 shaped in conformity with the contour of the pipe 173 and an O ring 176 positioned at the base end of the bush 175. When the pipe 173 is to be inserted into the housing 171, each of opposite legs 177a of a U-shaped stopper 177 is inserted the pair of apertures 172 of the housing. The pipe 173 is then inserted inside the housing 171 until the tapered portion 174 moves past the stopper 177. This brings a stepped part 174a of the tapered portion 174 of the pipe 173 into contact with the inner end face 177b of the stopper 177, whereby the pipe 173 is joined to the housing (see Unexamined Japanese Patent Publication No. 225290/1983).

FIG. 61 shows another pipe joint which is prepared by inserting a pipe 181 into a housing 180 and inserting a U-shaped stopper 182 into the housing 180 from outside for opposite legs 183 of the stopper 182 to hold the pipe 181 therebetween (see Examined Japanese Patent Publication No. 44876/1982).

With the former joint of the prior art, the legs 177a of the U-shaped stopper 177 need to be manually inserted into the respective pairs of upper and lower apertures of the housing 171, and a similar problem is encountered in removing the pipe 173 from the housing 171. Furthermore, the bush 175 and the O ring 176 must be set in position inside the housing 171 in advance in addition to the manual insertion of the U-shaped stopper 177. Accordingly, the pipe joint has the problem of necessitating time for joining the pipes and being inefficient to fabricate, for example, when it is used for preparing piping for an air conditioner within the limited space of engine room of the motor vehicle shown in FIG. 57. The construction wherein the U-shaped stopper 177 is inserted in the housing 171 has other problems. As shown in FIG. 60, the stopper 177 is in contact with the housing 171 locally at four portions against an external force acting in a direction to slip off the pipe 173, and concentration of force occurs at these portions. The construction is therefore undesirable from the viewpoint of strength. These portions readily permit ingress of extraneous matter, which could lead to corrosion.

With the latter pipe joint, the pipe 181 must be inserted into the housing 180 before the insertion of the stopper 182. Like the fomer, the pipe joint has the problem of a reduced work efficiency when used in the piping for automotive air conditioners.

Heat exchangers have a header pipe for distributing the heat exchange medium to the core portion. For connecting an outlet or inlet pipe for the medium to the header pipe, a union joint is used, or a pipe flange is provided at the joint end portion of each of the header pipe and the other pipe. However, these joint means have problems. The union joint requires a length of time for tightening up the union nut, while the latter necessitates labor for fastening the pipe flanges with screws.

FIG. 62 illustrates another example of joint, i.e., a joint for connecting liquid transport pipes 196 to a receiver 191. The receiver 191 has at opposite sides of its head 192 a liquid inlet portion 193 and a liquid outlet portion 194 each formed with a tubular male screw. The transport pipe 196 has an annular projection 195 close to the outer end thereof, and a cap nut 197 fitted therearound and positioned closer to the other end thereof than the projection 195. The pipe 196 is joined to each of the inlet portion 193 and the outlet portion 194 by inserting the pipe 196 into the portion and screwing the cap nut 197 on the tubular male screw.

FIG. 63 shows a receiver 201 which has a refrigerant inlet pipe 202 and a refrigerant outlet pipe 203 connected to the top of the receiver by block joints 204, 205, respectively (Unexamined Japanese Patent Publication No. 195256/1986). In this case, the block joints 204, 205 respectively have bolts 205, 207 which are screwed into holes 208 in the top portion of the receiver 201 from above with a tool, whereby the inlet and outlet pipes 202, 203 are attached to the receiver.

The former of the receivers described has an increased number of components, while the pipe must be joined to each side of the head 192 by manually turning the cap nut 192 and finally tightening up the cap nut with a tool. The joint therefore has the problem that the pipe requires cumbersome work for attachment and removal. With the latter receiver, the pipe can be attached more easily than when the cap nut is used, but the tool is indispensable for screwing or removing the bolts 206, 207, hence a low work efficiency.

FIGS. 64 and 65 show a pipe joint which comprises a first pipe 222 having an annular outer peripheral projection 221 close to a pipe end and an O ring 223 provided around a spigot portion 22a closer to the pipe end than the projection 221, and a second pipe 224 having an enlargded tubular portion 22a closer a pipe end. The enlarged tubular portion 224a of the second pipe 224 is formed with two pairs of vertically opposed small holes 224b. When the first pipe 222 is inserted into the tubular portion 224a with a U-shaped pin 225 inserted through the small holes 224b, the annular projection 221 of the first pipe 222 forces the pin 225 open to fit into the portion 224a inwardly of the pin, with the result that the first pipe 222 is joined to the second pipe 224 inside thereof.

FIGS. 66 and 67 show another pipe joint. When a first pipe 222 is inserted into an enlarged tubular portion 224a of a second pipe 224 with a ringlike stopper 227 fitted in slits 226 formed in opposite sides of the tubular portion 224a, an annular peripheral projection 221 of the first pipe 222 forces the stopper 227 open to further fit into the tubular portion inwardly of the stopper, whereby the first pipe 222 is joined to the second pipe 224.

With the former of the conventional pipe joints described, the U-shaped pin 225 is merely inserted and is therefore likely to slip off due to vibration, for example, when the joint is used for the piping for an automotive air conditioner. With the latter pipe joint, a space S is formed between the ringlike stopper 227 and the annular projection 221 of the first pipe 222, so that the first pipe 222 is liable to move at its base end side relative to the second pipe 224, for example, owing to vibration. Thus, the pipe joint has the problem of being unstable.

SUMMARY OF THE INVENTION

The main object of the present invention is to provide a pipe joint for joining pipes reliably by a simple procedure.

Another object of the present invention is to provide a pipe joint for joining a pipe to the header pipe of a heat exchanger easily and reliably.

Another object of the present invention is to provide a pipe joint for joining pipes readily with good stability without using a housing or the like.

Another object of the present invention is to provide a pipe joint for joining a transport pipe to a tank or the like easily and reliably.

BRIEF DESCRIPTION OF THE DRAWINGS

FIG. 3 is a view in section taken along the line 3—3 in FIG. 2;

FIG. 4 is a view in section taken along the line 4—4 in FIG. 2;

FIG. 6 is a front view showing an example in which the pipe joint of the invention is used;

FIG. 9 is an enlarged fragmentary perspective view of the pipe joint portion of FIG. 8;

FIG. 10 is a fragmentary view in section showing a transport pipe as joined to a header pipe in FIG. 8;

FIG. 21 is a front view of a stopper;

FIG. 22 is a view in section taken along the line 22—22 in FIG. 21;

FIG. 23 is a front view showing a different embodiment of stopper as installed in place;

FIG. 24 is a front view of the stopper;

FIG. 32 is an exploded front view showing another embodiment of pipe joint for use in the receiver;

FIG. 33 is an exploded perspective view showing a pipe joint of the invention as applied to a muffler tank;

FIG. 34 is a fragmentary sectional view showing a pipe as connected to the tank;

FIG. 35 is a perspective view of a stopper embodying the invention;

FIG. 36 is a plan view of the stopper;

FIG. 37 is a view in vertical section of a socket portion;

FIG. 38 is a view in section taken along the line 38—38 in FIG. 37;

FIG. 39 is a front view of a stopper embodying the invention;

FIG. 40 is a view in section taken along the line 40—40 in FIG. 39;

FIG. 41 is a bottom view of the stopper;

FIG. 42 is a view in vertical section of a socket portion in which the stopper is to be installed;

FIG. 43 is a view in section taken along the line 43—43 in FIG. 42;

FIG. 44 is a view in horizontal section showing the stopper as installed properly in the socket portion;

FIG. 45 is a view in horizontal section showing the stopper as installed in the socket portion reversely;

FIG. 46 is a front view of another stopper embodying the invention;

FIG. 47 is a view in section taken along the line 47—47 in FIG. 46;

FIG. 48 is a rear view of the stopper;

FIG. 49 is a view in vertical section of a socket portion in which the stopper is to be installed;

FIG. 50 is a view in section taken along the line 50—50 in FIG. 49;

FIG. 51 is a view in horizontal section showing the stopper as installed properly in the socket portion;

FIG. 52 is a view in horizontal section showing the stopper as installed in the socket portion reversely;

FIG. 53 is a perspective view of a modified pipe joint structure to show a socket portion, stopper and pipe as separated;

FIG. 54 is a view in vertical section of the socket portion;

FIG. 55 is a view in section taken along the line 55—55 in FIG. 5;

FIG. 56 is a view in vertical section showing the pipe as joined to the socket portion;

FIG. 64 is a view in vertical section showing a conventional example;

FIG. 65 is an exploded perspective view of the conventional example shown in FIG. 65;

FIG. 66 is a sectional view of another conventional example; and

FIG. 67 is a perspective view of a stopper included in the example of FIG. 66.

DESCRIPTION OF THE PREFERRED EMBODIMENTS

Figure 1:
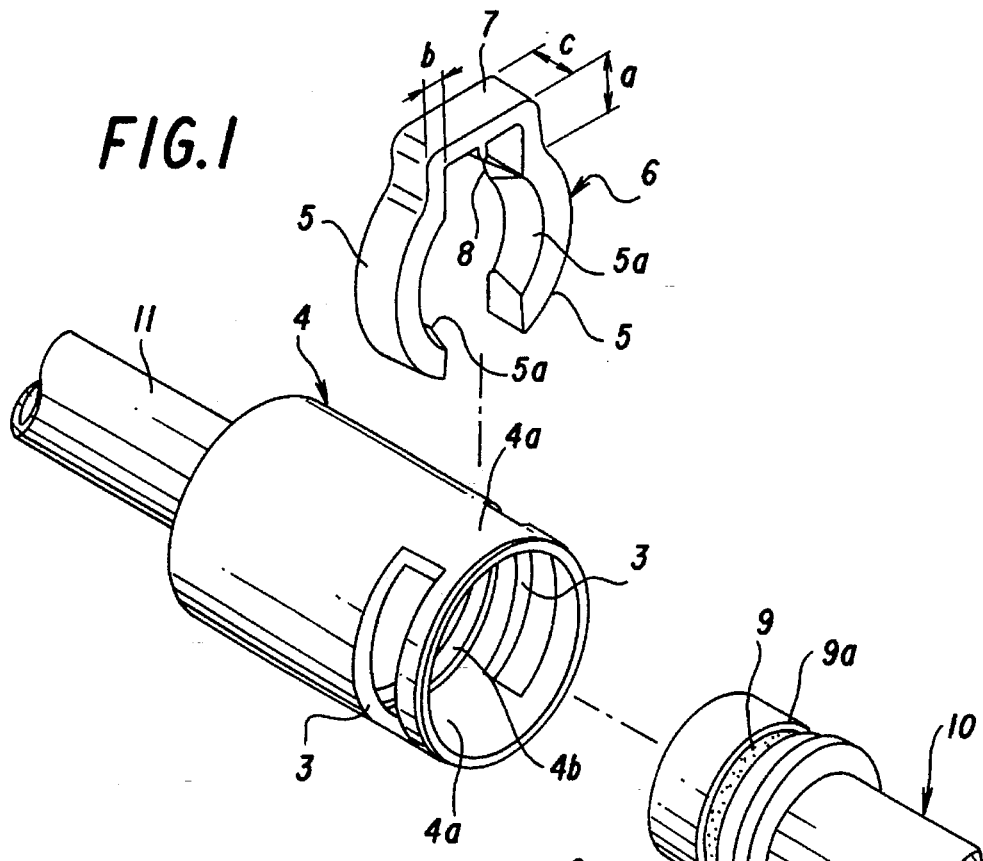
FIG. 1 is an exploded perspective view showing an embodiment of pipe joint of the invention.
Figure 2:
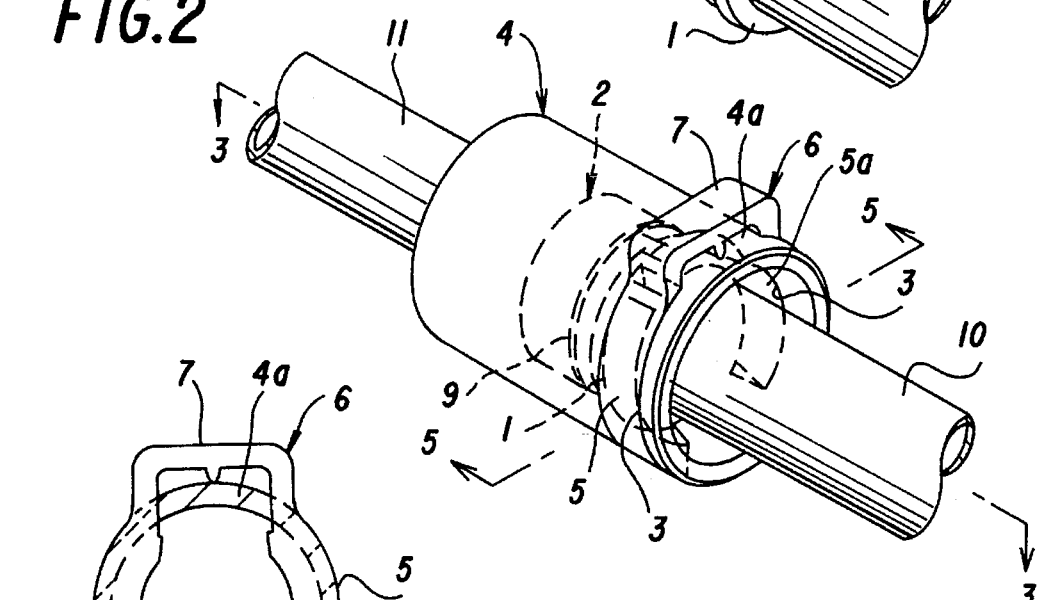
FIG. 2 is a perspective view showing pipes as joined together.

Pipe joints embodying the present invention will be described below.

FIGS. 1 to 4 show a pipe joint for joining two pipes 10, 11 end to end. The pipe joint comprises a hollow cylindrical spigot portion 2 having an annular projection 1 on the outer periphery of a base end thereof; a hollow cylindrical socket portion 4 having an inside diameter approximately equal to the outside diameter of the spigot portion 2 and formed with two opposed apertures 3 in its peripheral wall close to a forward end thereof and with a stepped part 4b on the inner surface of the peripheral wall for the annular projection 1 of the spigot portion 2 to come into contact with, the stepped part 4b being closer to a base end of the socket portion 4 than the apertures 3; and a stopper 6 having a pair of circular-arc resilient legs 5 fittable into the respective apertures 3 of the socket portion 4 from outside to project inward and each having a slanting inner surface 5a, the legs 5 being opposed to each other for the inwardly curved surfaces thereof to face each other; the annular projection 1 of the spigot portion 2 being fixedly holdable between the leg 5 of the stopper 6 and the stepped part 4b of the inner periphery of the socket portion 4 by inserting the stopper 6 into the apertures 3 of the socket portion 4 with the slanting surfaces 5a of the legs facing toward the insertion side of the spigot portion 2 and inserting the spigot portion 2 into the socket portion 4 until the annular projection 1 moves past the legs 5; the spigot portion 2 and the socket portion 4 being provided at the joint ends of the two respective pipes to be joined.

The pipes 10, 11 and the spigot portion 2 and the socket portion 4 at their joint ends are made of aluminum alloy. The stopper is made of synthetic resin.

A head portion 7 for clamping a bridge 4a between the two apertures 3 of the socket portion 4 from outside is provided between ends of the legs 5 integrally therewith, and a protrusion 8 is formed on the inner surface of each of the legs 5 at a base portion thereof. The spigot portion 2 has an annular groove 9a formed in its outer periphery and positioned closer to a forward end thereof than the annular projection 1, and an O ring 9 is fitted in the groove 9a.

With reference to FIG. 1, the stopper 6 has the dimensions of: a=2.5 mm, b=2.4 mm and c=4.9 mm. In this case, the outside diameter of the opposed circular-arc legs 5 is equal to the outside diameter of the cylindrical socket portion 4, and is 8 mm. When the stopper 6 is so sized that a=2.5 mm, b=2.4 mm and c=5.9 mm, the socket portion 4 and the opposed legs 5 are 15.88 mm in outside diameter. When the outside diameter was 8 mm, the insertion load of the stopper 6 on the socket portion 4 was 5.2 kg/cm$^2$, and the burst pressure was at least 200 kg/cm$^2$. When the outside diameter was 15.88 mm, the insertion load of the stopper 6 was 4.8 kg/cm$^2$ and the burst pressure was 122.5 kg/cm$^2$.

Figure 5:
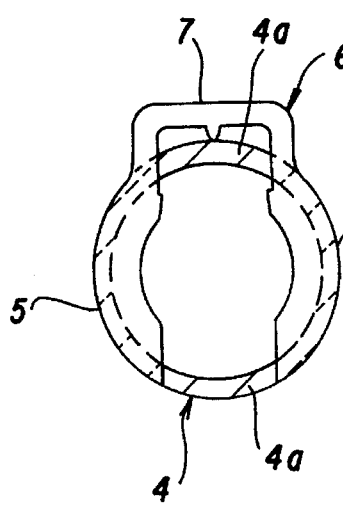
FIG. 5 is a reference view showing the state of contact between a socket portion and a stopper in a pipe joint portion.

Even when an external force acts on the aluminum pipe 10, causing the pipe to slip off from the pipe joint described, the opposed circular-arc resilient legs 5 of the stopper 6 contact the socket portion 4 over a wide area (hatched portion in FIG. 5) to hold the pipe joined to the portion 4. Accordingly the pipe 10 is joined to the pipe 11 firmly with good stability.

The opposed legs 5 of the stopper 6 are moved away from each other when to be fitted into the apertures of the socket portion 4 and return to the original state upon fitting into the apertures 3. The protrusion 8 on the base portion inner surface of each leg 5 engages with the bridge 4a of the socket portion 4, whereby the stopper 6 is prevented from slipping off the socket portion 4.

The joint end portion of the pipe 11 is diametrically enlarged within the socket portion 4 and has a flange 11a in engagement with the stepped part 4b of the inner periphery of the socket portion 4. The pipe 11 is joined to the socket portion 4 as positioned therein in intimate contact therewith in advance and is rotatable relative to the socket portion. In this case, the pipe 11 is given improved circularity by the enlarging work, so that when the spigot portion 2 of the other pipe 10 is inserted into the pipe 11, the O ring 9 around the portion 2 reliably comes into contact with the inner periphery of the pipe 11 to give improved gas tightness to the joint.

FIG. 6 shows a specific example wherein the pipe joint described is applied to the evaporator of a motor vehicle air conditioner. Indicated at 12 is the body of the evaporator, and at 13, 14 are transport pipes for the heat exchange modium. The spigot portion 4 is provided at the forward end of each of these pipes 13, 14. The joint end of each of pipes 15, 16 to be joined to the respective transport pipes 13, 14 is provided with the spigot portion 2. The pipe 15 (16) is joined to the transport pipe 13 (14) with the stopper 6 provided therebetween.

Figure 7:
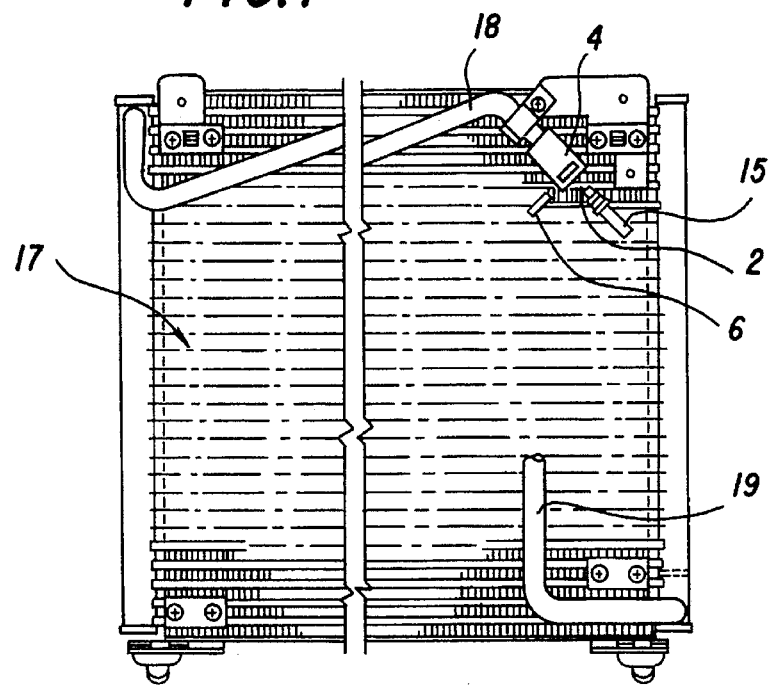
FIG. 7 is a front view showing another example in which the pipe joint is used.
Figure 8:
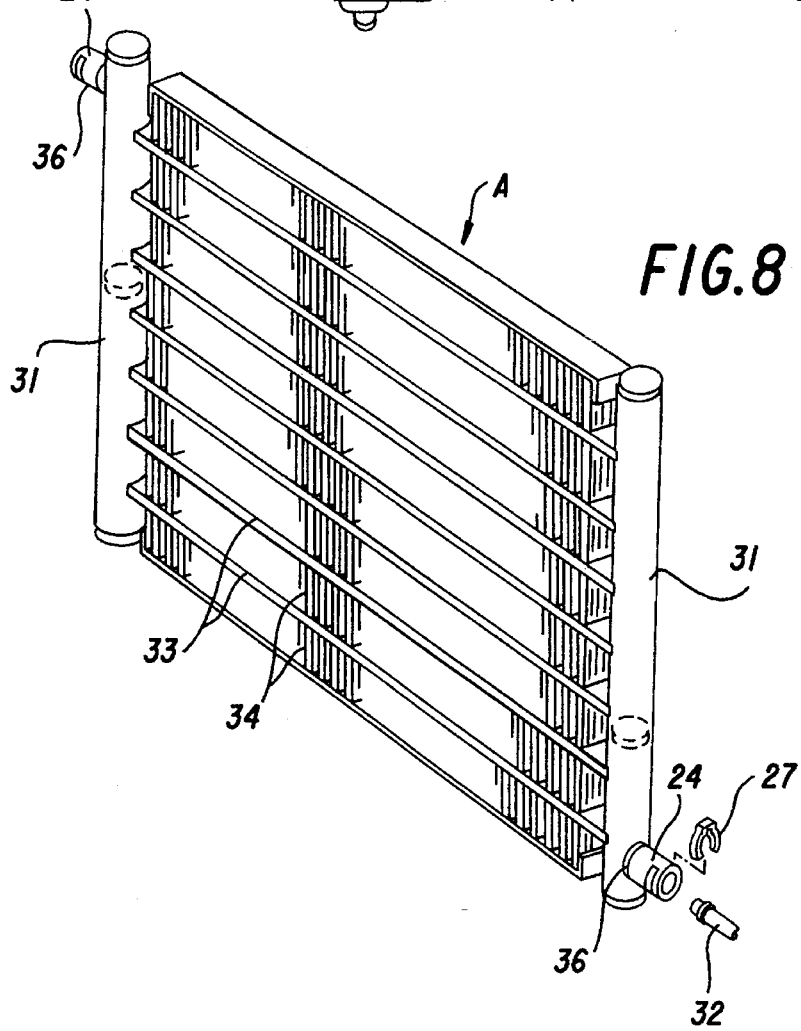
FIG. 8 is a perspective view showing an embodiment of pipe joint of the invention as used in a heat exchanger.

FIG. 7 shows a specific example, in which the above pipe joint is used for the condenser of an automotive air conditioner. Indicated at 17 is the body of the condenser, and at 18, 19 are transport pipes for the heat exchange medium. The forward end of each transport pipe 18 (19) is connected to other pipe 15 by the pipe joint.

FIGS. 8 to 18 show embodiments of the invention as used in the piping for the condenser of an automotive air conditioner.

FIGS. 8 to 13 show one of the embodiments. The condenser has a core A which is made of aluminum (including an aluminum alloy). The core A comprises vertical header pipes 31, a multiplicity of horizontal flat tubes 33 made of extruded material, arranged one above another at a spacing and joined to the pipes 31, and corrugated fine 34 provided between the flat tubes 33.

The present embodiment is a pipe joint for joining a transport pipe 32 to the header pipe 31. The pipe joint comprises a hollow cylindrical spigot portion 23 having an annular projection 21 on the outer periphery thereof close to a forward end thereof; a hollow cylindrical socket portion 24 having an inside diameter equal to the outside diameter of the spigot portion 23 and formed with two opposed apertures 25 in its peripheral wall close to a forward end thereof and with a stepped part 24b on the inner surface 24b of the peripheral wall of a base end portion thereof for the annular projection 21 of the spigot portion 23 to come into contact with; and a stopper 30 having two circular-arc resilient legs 27 fittable into the repective apertures 25 from outside to project inward and opposed to each other for the inwardly curved surfaces thereof to face each other, each of the legs 27 having a slanting inner surface 27a; the annular projections 21 of the spigot portion 23 being fixedly holdable between the stepped part 24b of the inner surface of the socket portion 24 and the legs of the stopper 30 by inserting the stopper 30 into the apertures 25 of the socket portion 24 with the slanting surfaces 27a of the legs 27 facing toward the pipe insertion side and inserting the spigot portion 23 into the socket portion 24 until the annular projection 21 moves past the legs 27. The socket portion 24 is provided on a peripheral wall 24a close to the lower end of the header pipe 31, while the spigot portion 23 is provided at the end of the transport pipe 32 to be joined to the pipe 31.

The two apertures 25 in the socket portion 24 are positioned as opposed to each other and are each in the form of a slit. A bridge 24c is formed between these apertures 25. The stopper 30 is made of synthetic resin. A head 28 in a recessed form when seen from one side for clamping the bridge 24c of the socket portion 24 is provided between and integral with the circular-arc resilient legs 27. The head 28 is formed on the inner surface of its base portion with a protrusion 29 for preventing the stopper from slipping off. On the other hand, the spigot portion 23 at the joint end portion of the transport pipe 32 has a groove 23a in its outer periphery, with an O ring 22 fitted in the groove.

Figure 11:
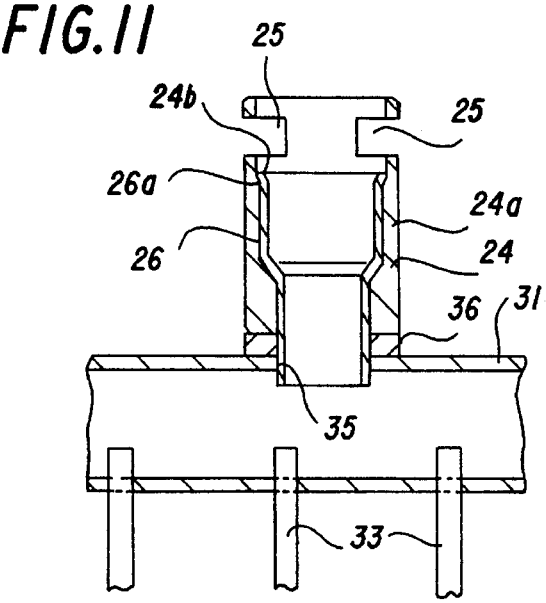
FIG. 11 is a fragmentary view in section showing a joint structure of a socket portion of the header pipe.

As shown in FIG. 11, a pipe member 26 of aluminum is inserted in the socket portion 24 and has a forward end portion which is diametrically enlarged and formed with a flange 26a in engagement with the inner periphery of the socket portion 24. The pipe member 26 has a base end which is fitted in a hole 35 formed in advance in the peripheral wall of the header pipe 31. The base end is joined directly to the peripheral wall of the pipe 31 by brasing with use of a brazing ring 36 fitted between the pipe wall and the socket portion 24. The brazing ring 36 is prepared by pressing an aluminum brazing sheet which comprises a core clad with a brazing filler metal over opposite sides thereof.

The annular projection 21 is formed by beading around the transport pipe 32 at a position a specified distance from its forward extremity to provide the spigot portion 23 at the joint end portion of the pipe 32 integrally therewith.

The header pipe 31 is prepared from an aluminum brazing sheet comprising a core clad with a brazing filler metal over opposite surfaces thereof, by forming the sheet into a tubular form by press work and joining the edges by a butt joint. The header pipe 31 need not always be formed by the above method but can be an extrduate pipe, electroresistance welded pipe or a pipe prepared by joining opposed half segments of semicircular cross section.

When the transport pipe 32 is to be connected to the header pipe 31 by the joint of the embodiment described above, the stopper 30 is first fitted into the apertures 25 in the socket portion 24 on the header pipe 31 from outside over the bridge 24c. At this time, the legs 27 of the stopper 30 are fitted into the apertures 25 to project inward with the head 28 fitted over the bridge 24c. In this case, the protrusions 29 on the inner surface of base portions of the legs 27 are in engagement with the bridge 24c against an external force acting to remove the stopper 30, whereby the stopper 30 is prevented from slipping off.

Next, the spigot portion 23 of the transport pipe 32 is inserted into the socket portion 24, whereby the annular projection 21 of the spigot portion 23 is smoothly advanced into the socket portion 24 along the slanting surfaces 27a of the opposed legs 27 of the stopper 30 while forcing the legs away from each other against their resilience. Upon the annular projection 21 moving past the legs 27 into contact with the stepped part 24b of the socket portion 24, the legs 27 resiliently return toward each other, with the result that the annular porjection 21 of the spigot portion 23 is fixedly held between the stopped part 24b and the stopper legs 27. The transport pipe 32 is readily joined to the header pipe 31 by the engagement of the spigot portion 23 in the socket portion 24. The O ring 22 provided around the pigot portion 23 seals off the joint between the two pipes.

The transport pipe 32 is held joined to the header pipe 31 with good stability because the opposed legs 27 are in contact with the annular projection 21 of the spigot portion 23 over nearly the entire circumference therof, preventing the pipe 32 from slipping off against the external force acting to remove the pipe. Moreover, the annular projection 21 of the spigot portion 23 is fixed as held between the stopped part 24b of the socket portion 24 and the stopper legs 27, so that the pipe 32 will not backlash relative to the header pipe 31.

Figure 12:
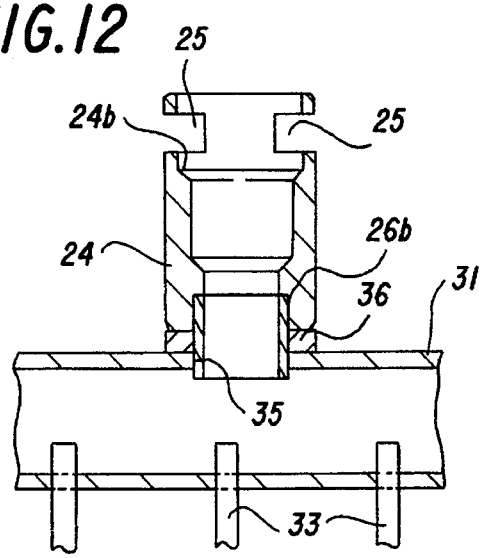
FIG. 12 is a fragmentary view in section showing another joint structure of the socket portion of the header pipe.

FIG. 12 shows a modification of the socket portion 24 of the above embodiment. A sleevelike pipe member 26b is provided in the base end of the socket portion 24 with a press fit in place of the pipe member 26 of the above embodiment having an enlarged outer end.

Figure 13:
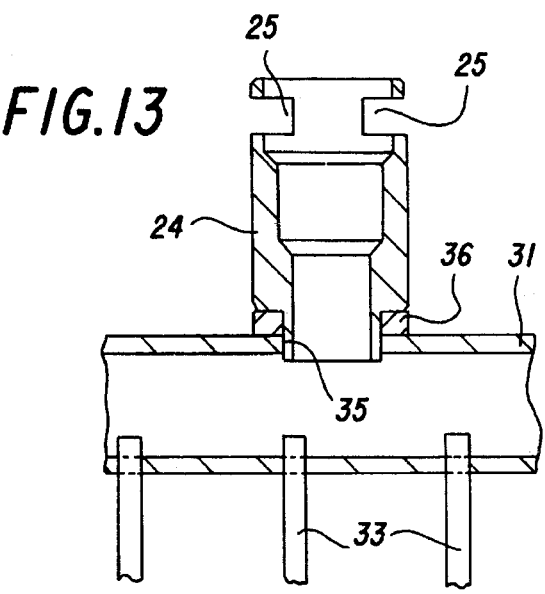
FIG. 13 is a fragmentary view in section showing still another structure of the socket portion of the header pipe.

FIG. 13 shows another modification of the socket portion 24. Instead of inserting the separate pipe member 26 of the above embodiment having an pipe member 26 or 26b into the socket portion 24, an integral socket portion 24 corresponding to the combination of the member and the portion 24 is prepared by cutting work.

Although the socket portion 24 is provided on the header pipe 31 of the condenser 31 with the transport pipe 32 formed with the spigot portion 23 according to the embodiments described, these portions 23, 24 may be provided in a reverse relation.

Figure 14:
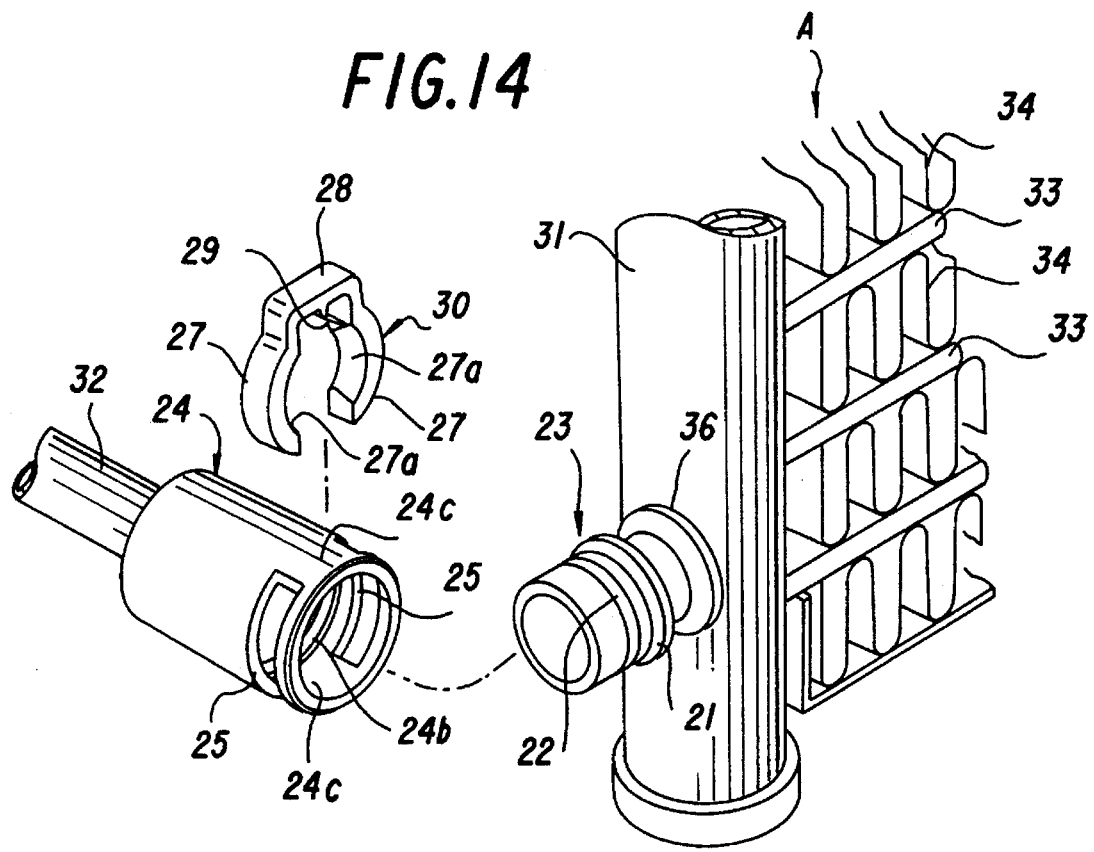
FIG. 14 is a perspective view showing another embodiment of pipe joint of the invention as used in a heat exchanger.

More specifically, the spigot portion 23 is attached directly to the peripheral wall of the header pipe 31, and the socket portion 24 is provided at the joint end portion of the transport pipe 32 as shown in FIG. 14. The spigot portion 23 and the socket portion 24 per se are the same as in the foregoing embodiments in construction.

Figure 15:
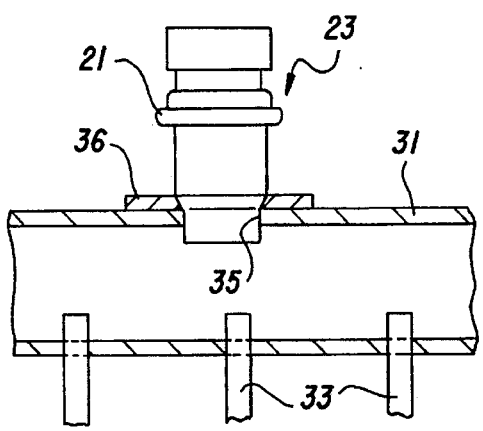
FIG. 15 is a fragmentary view in section showing a joint structure of a spigot portion of the header pipe.
Figure 16:
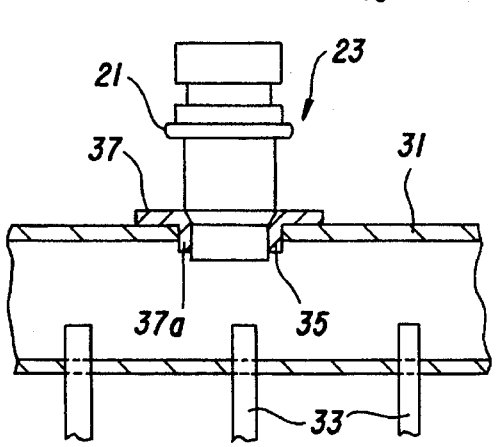
FIG. 16 is a fragmentary view in section showing another joint structure of the spigot portion of the header pipe.
Figure 17:
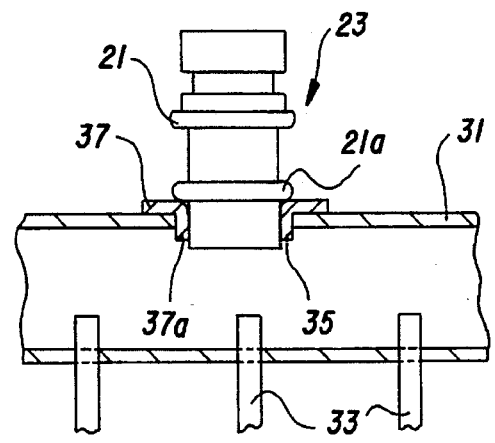
FIG. 17 is a fragmentary view in section showing another joint structure of the spigot portion of the header pipe.

FIG. 15 shows an embodiment wherein the spigot portion 23 is attached to the peripheral wall of the header pipe 31. The spigot portion 23 has an annular projection 21 formed by beading on its forward end and is diametrically contracted at the other end. The spigot portion 23 is attached to the header pipe 31 by inserting the portion 23 into a hole 35 in the pipe 31 and brazing the portion 23 to the pipe with a brazing ring 36 provided around the hole 35. Alternatively, a modified brazing ring 37 is usuable which has an inner flange 37a as seen in FIG. 16. The modified ring is also usable in the embodiment of FIG. 11 in place of the ring 36. In addition to the annular projection 21 at the forward end of the spigot portion 23, another annular ring 21a may also be provided around the other end as shown in FIG. 17.

Figure 18:
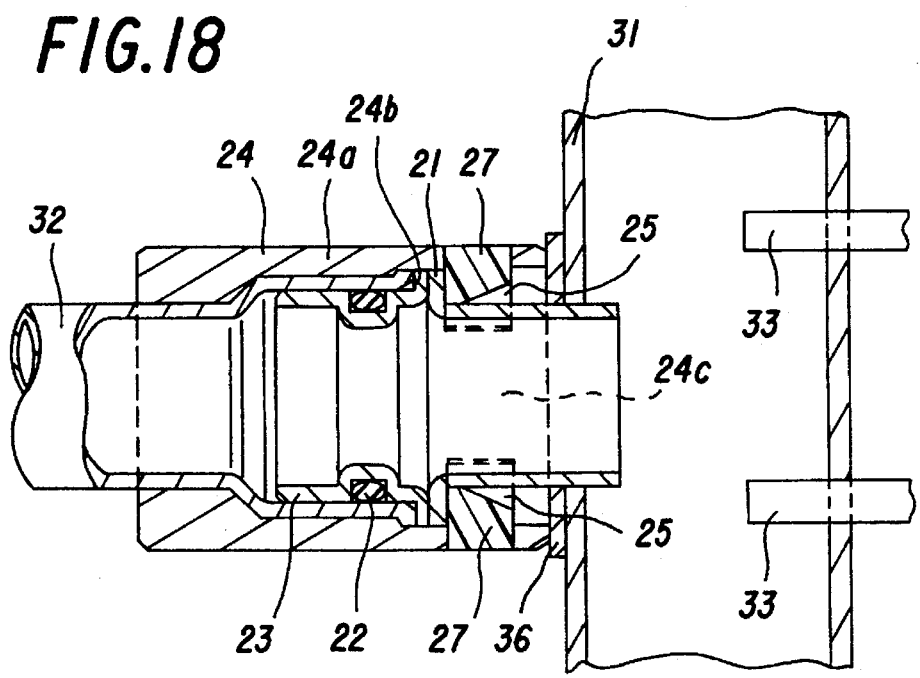
FIG. 18 is a fragmentary view in section showing the structure of a socket portion of the transport pipe.
Figure 19:
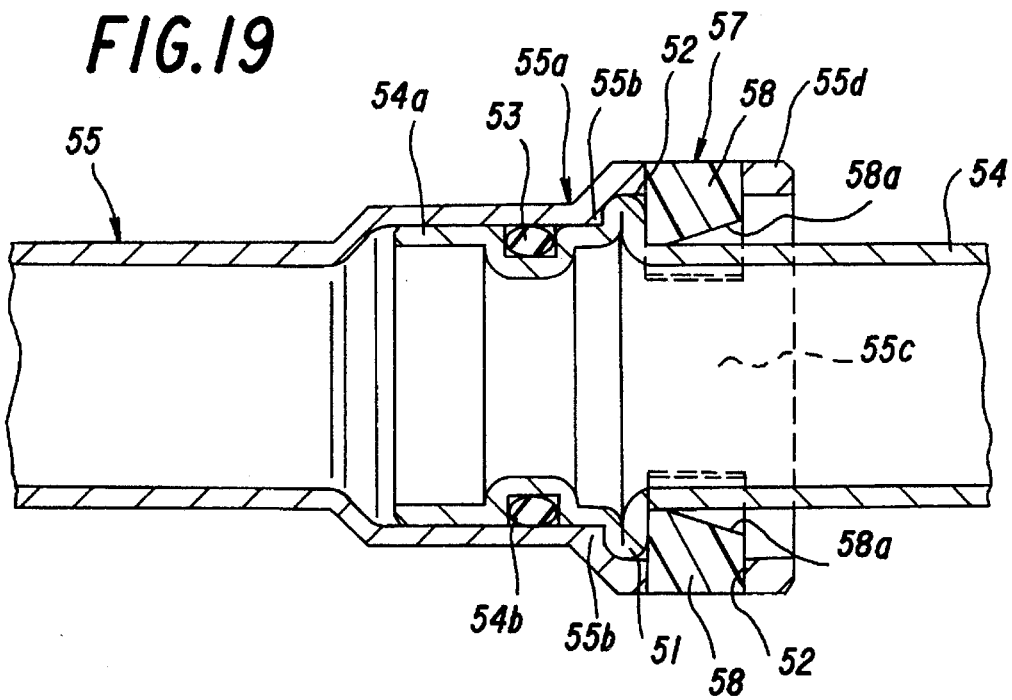
FIG. 19 is a view in horizontal section showing an embodiment of pipe joint of the invention.
Figure 20:
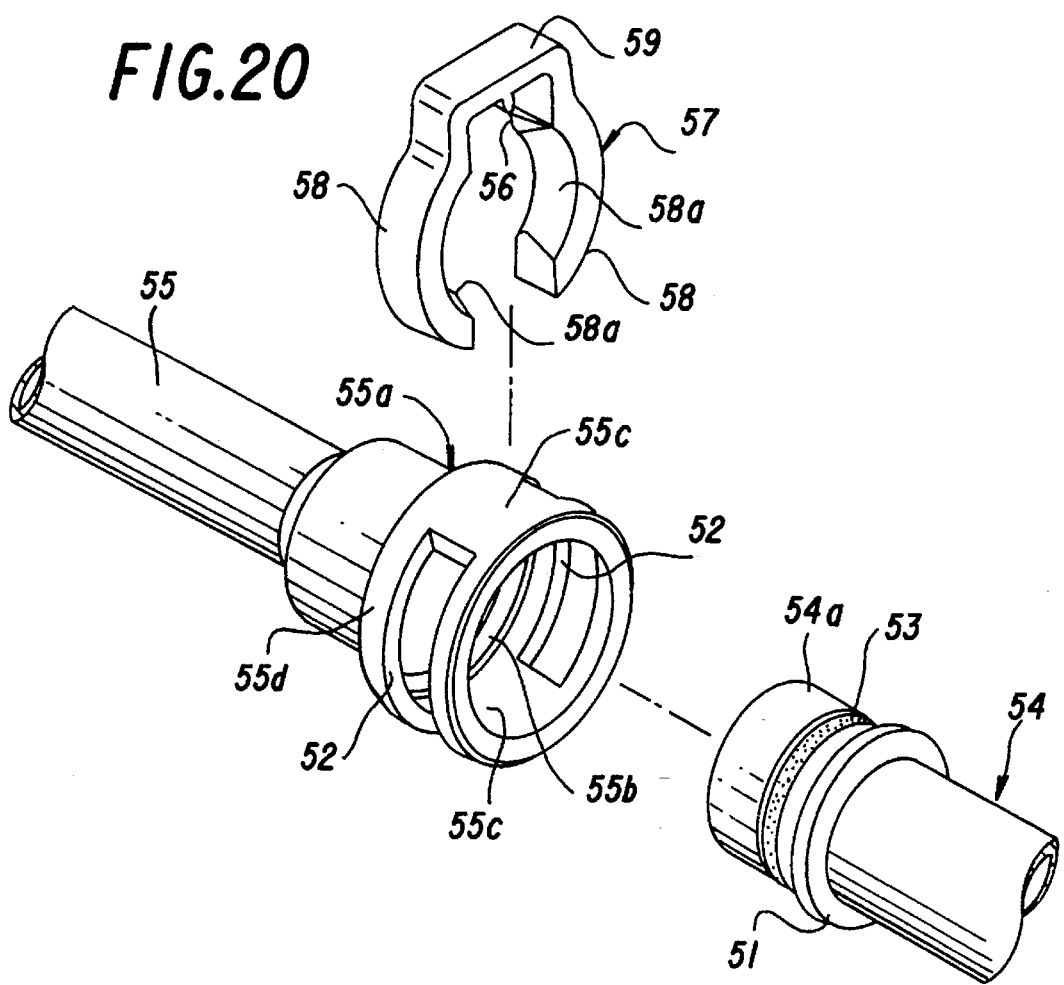
FIG. 20 is an exploded perspective view of the pipe joint of FIG. 19.

FIG. 18 shows the state of engagement of the socket portion 24 on the joint end of the transport pipe 32 with the spigot portion 23 on the header pipe 31. The end of the transport pipe 32 is diametrically enlarged and engaged with the inner periphery of the socket portion 24, in which the spigot portion 23 of the header pipe 31 is fitted.

Although the spigot portion or socket portion is additionally provided on the peripheral wall of the header pipe for connection to the transport pipe as described above, the invention is not limited to this construction. The header pipe may have a joint end portion which itself serves as the socket portion, to which the joint end portion of the transport pipe providing the spigot portion is joined with use of the stopper.

Furthermore, transport pipes may be modified as described below which pipes have a base end joined to a header pipe as by welding and a forward end the a peripheral wall of which is provided with a bracket engeable with the header pipe. A hollow cylindrical socket portion is provided at the forward end, with the bracket made to project from the peripheral wall of the socket portion integrally therewith. A transport pipe having a joint end providing a spigot portion is joined to the socket portion.

FIGS. 19 to 24 is another embodiment of pipe joint of the present invention.

The pipe joint of the invention comprises a first pipe 54 of aluminum having an annular projection 51 on its outer periphery close to a forward end thereof an an O ring 53 fitted around a spigot portion 54a closer to the forward end than tha ananular projection 51; a second pipe 55 integrally formed with a socket portion 55a at one end thereof, the socket portion 55a having an inside diameter approximately equal to the outside diameter of the first pipe 54 in its peripheral wall close to a forward end thereof and with a stopped part 55b on the inner surface of the peripheral wall for the annular projection 51 of the first pipe 54 to come into contact with, the stepped 55b being closer to a base end of the socket protion 55a than the apertures 52; and a synthetic resin stopper 57 having two circular-arc resilient legs 58 fittable into the respective apertures 52 from outside to project inward and opposed to each other for the inwardly curved surfaces thereof to face each other, each of the legs 58 having a slanting inner surface 58a; the annular projection 51 of the first pipe 54 being fixedly holdable between the leg 58 of the stopper 57 and the stepped part 55b of the inner periphery of the socket portion 55a of the second pipe 55 by inserting the stopper 57 into the apertures 52 of the socket portion 55a of the second pipe 55 with the slanting surfaces 58a of the legs 58 facing toward the insertion side of the first pipe 54 and inserting the first pipe 54 into the socket portion 55a until the annular projection 51 moves past the legs 58.

The socket portion 55a of the second pipe 55 has a bridge 55c at the side portion thereof between the opposed apertures 52. A head 59 extends between ends of the legs 58 integrally therewith. A slipping-off preventing engaging portion 56 is formed on the inner surface of base part of each leg 58. The O ring 53 is fitted in a groove 54b formed in the outer periphery of the spigot portion 54a of the first pipe 54. Instead of forming this groove 54b, the O ring may be fitted arount spigot portion 54a using a backup ring.

The stepped part 55b of inner periphery of the second pipe 55 is adapted to intimately contact a side face of the annular projection 51 of the first pipe 54.

With the pipe joint of the present embodiment, the stopper 57 is first inserted into the socket portion 55a of the second pipe over the bridge 55c, with the legs 58 fitted into the respective apertures 52, whereby the bridge 55c is clamped by the head 59 at the same time. Thus, the stopper 57 is attached to the second pipe socket portion 55a. Further the engaging portion 56 at the base portion of each leg 58 comes into engagement with the inner surface of the bridge 55c, preventing the stopper 57 from slipping off. The stopper 57 is readily fittable in place since the opposed legs 58 are then easily movable away from each other because of the configuration of the stopper.

Next, the first pipe 54 is inserted into the second pipe socket portion 55a having the stopper 57 fitted therein. At this time, the annular projection 51 of the first pipe 54 is readily movable into the second pipe 55 along the inner slanting surfaces 58a of the stopper legs 58 against the resiliency of the legs, and is eventually tightly held between the stepped part 55b inside the second pipe 55 and the legs 58. As a result, the first pipe 54 is joined to the second pipe 55 reliably with good stability.

FIGS. 23 and 24 show another embodiment of stopper of the invention. The stopper, now indicated at 67, has a V-shaped head 69, which is integral with circular-arc resilient legs 68 as in the foregoing embodiment. When the stopper 67 is to be removed from the apertures 52 of the second pipe socket portion 55a, knob pieces 69a constituting the V-shaped head 69 are nipped with fingers and then pressed toward each other, whereby the legs 68 are forced away from each other. Accordingly, the stopper is readily removable from the socket portion 55a.

Various embodiments of pipe joint of the invention for use in connecting pipes to tanks will be described with reference to the corresponding drawings.

Figure 25:
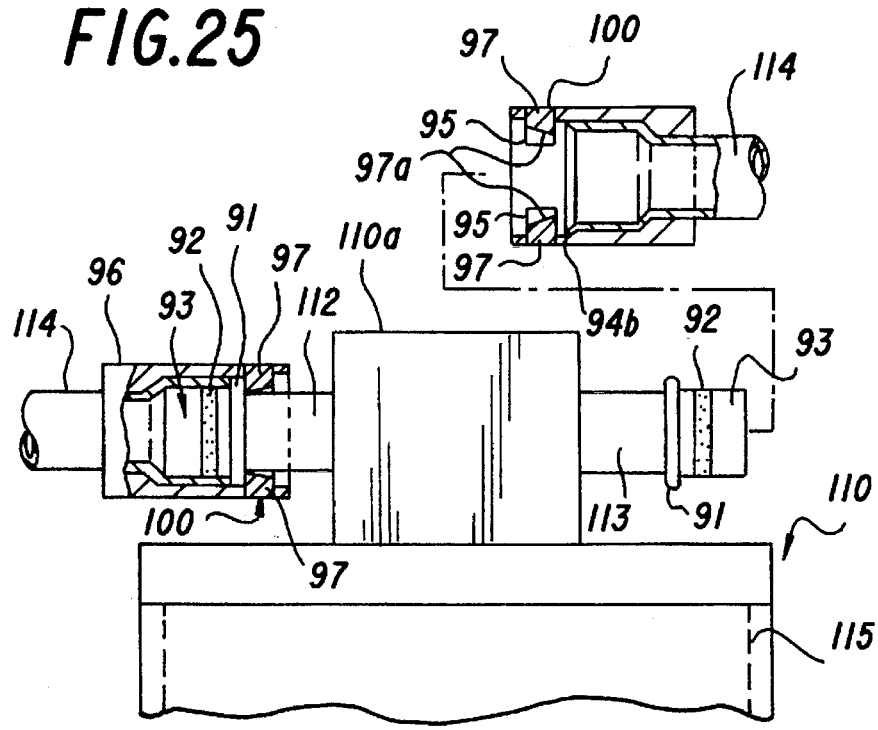
FIG. 25 is a fragmentary sectional view showing another embodiment of pipe joint at the head of a receiver.
Figure 26:
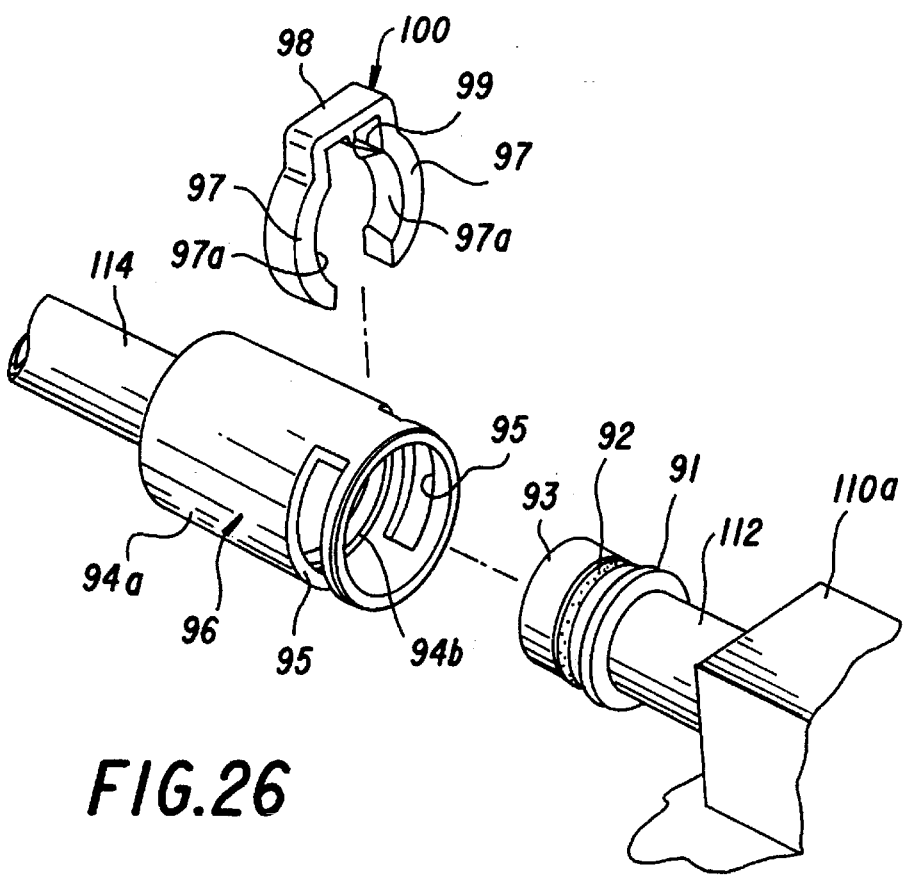
FIG. 26 is a fragmentary perspective view of the pipe joint of FIG. 25.

FIGS. 25 and 26 show a pipe joint of the invention used for attaching a pipe to a receiver. The head 110a of the receiver 110 has at opposite sides thereof a liquid inlet portion 112 and a liquid outlet portion 113, each of which serves as a spigot portion 93. On the other hand, a socket portion 96 is provided at the forward end of a pipe 114. The end of the pipe 114 is enlarged and fixedly fitted in the base end of the socket portion 96. A stopper 100 is fitted in apertures 95 of the socket portion 96. The embodiment will be described in detail below.

The pipe joint comprises a hollow cylindrical spigot portion 93 having an annular projection 91 on the outer periphery of a base end thereof and an O ring 92 fitted around its outer periphery and positioned closer to a forward end thereof than the projection 91; a hollow cylindrical socket portion 96 having an inside diameter equal to the outside diameter of the spigot portion 93 and formed with a pair of circumferential apertures 95 in its peripheral wall except at a part of the wall and with a stepped part 94b on the inner surface of the peripheral wall for the annular projection 91 of the spigot portion 93 to come into contact with; and a synthetic resin stopper 100 having a pair of circular-arc resilient legs 97 fittable into the respective apertures 95 from outside to project inward, each of the legs having a slanting inner surface 97a extending toward the insertion side of the spigot portion 93, the stopper 100 having a head portion 98 extending between and integral with ends of the legs 97 and a slipping-off preventing protrusion 99 formed on the inner surface of the base portion of each leg 97. The stopper 100 is removable fitted into the socket portion 96 at the forward end of the pipe 114, and the spigot portion 93 at each of the liquid inlet portion 112 and the liquid outlet portion 113 is hermetically inserted into the socket portion 96, whereby the annular projection 91 of the spigot portion 93 is fixedly held between the inner stepped part 94b of the socket portion 96 and the stopper legs 97 fitted in the respective apertures 95 of the socket portion 96. Thus, the pipe 114 is removably attached to the inlet portion 112 (outlet portion 113) of the receiver head 110a by the spigot portion 93 and the socket portion 96. With the above embodiment, the stepped part 94b is provided by the forward enlarged end of the pipe 114.

Figure 27:
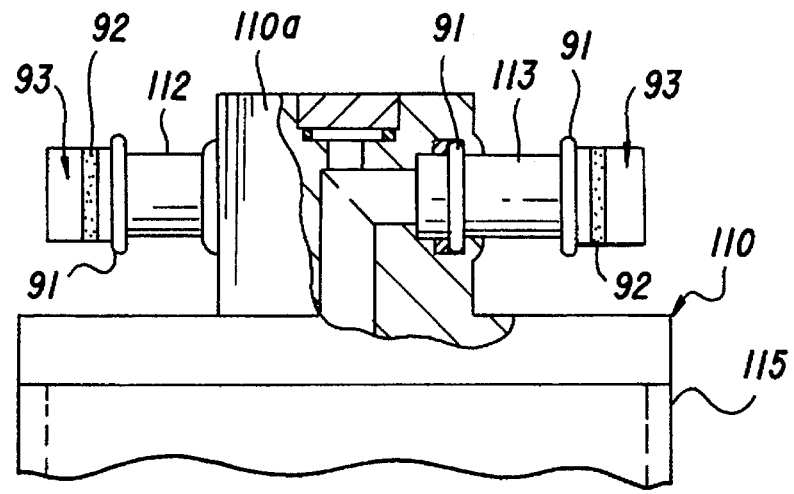
FIG. 27 is a fragmentary sectional view showing a modification of the pipe joint of FIG. 25.

FIG. 27 shows a modification of the pipe joint of FIGS. 25 and 26, in which an annular projection 91 is provided also toward the base end of each of liquid inlet and outlet portions 112, 113. The projection is fitted in the head 110a.

Figure 28:
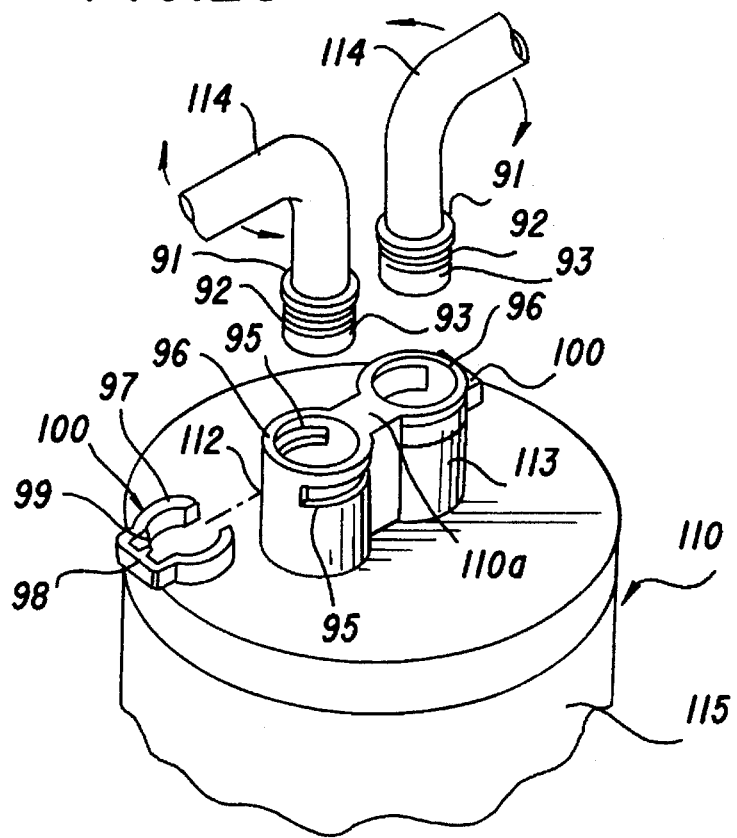
FIG. 28 is a perspective view of another embodiment of pipe joint at the head of the receiver.
Figure 29:
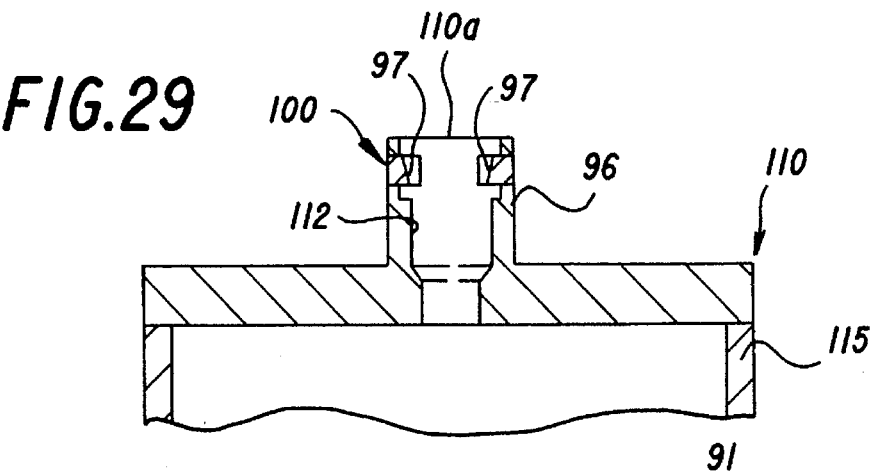
FIG. 29 is a fragmentary sectional view of the head portion having the joint of FIG. 28.

FIGS. 28 and 29 show another embodiment. The head 110a of the illustrate receiver 110 has liquid inlet portion 112 and liquid outlet portion 113 which extend upward. These portions each serve as a socket portion 96. The forward end of a pipe 114 provides a spigot portion 93, which is fitted into the socket portion 96 of the inlet portion 112 (outlet portion 113), with a stopper 100 fitted therein in advance, whereby the pipe 114 is attached to the portion 112 (113).

With the present embodiment, the inlet portion 112 and the outlet portion 113 at the opposite ends of the head 110a each serve as the socket portion 96 for connection to the pipe 114. This reduces the number of components. Further since the apertures 95 can be cut when the head 110a is formed, the overall device is easy to make. The two pipes 114 are rotatable in the directions of arrows shown in accordance with the condition for the instillation of the receiver 110.

Figure 30:
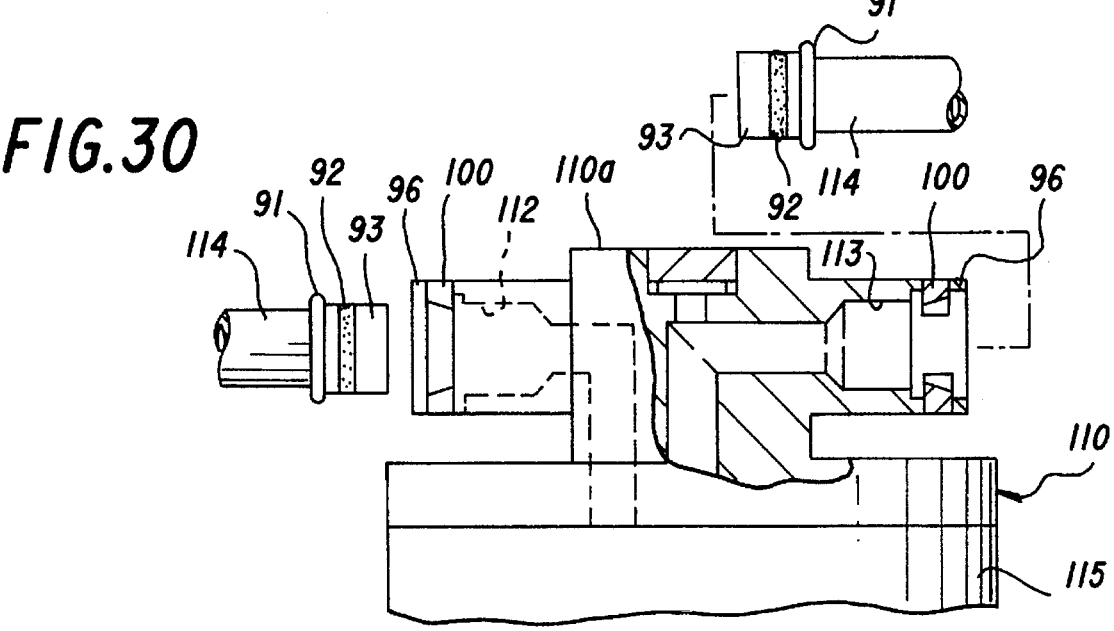
FIG. 30 is a fragmentary sectional view of another embodiment of pipe joint for use in the head of the receiver.

FIG. 30 shows another embodiment. The head 110a of the receiver 110 shown has a liquid inlet portion 112 and a liquid outlet portion 113 which are oriented horizontally and each of which serves as a socket portion 96. A spigot portion 93 is formed at the forward end of each pipe 114 and inserted into the socket portion 96 having a stopper inserted therein in advance, whereby the pipe 114 is connected to the inlet portion 112 (outlet portion 113). The head 110a is welded to a tank portion 115.

Figure 31:
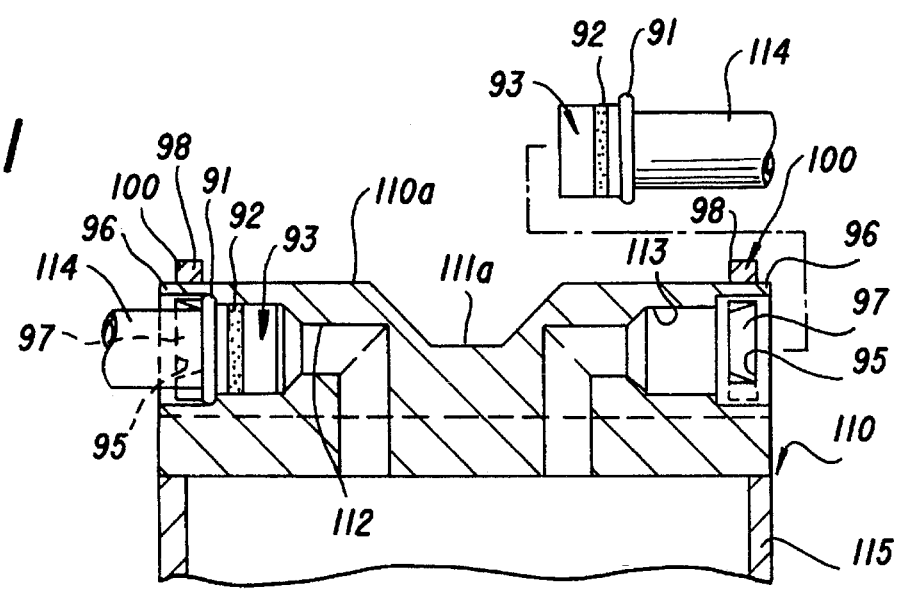
FIG. 31 is a fragmentary sectional view showing a modification of the pipe joint of FIG. 30.
Figure 57:
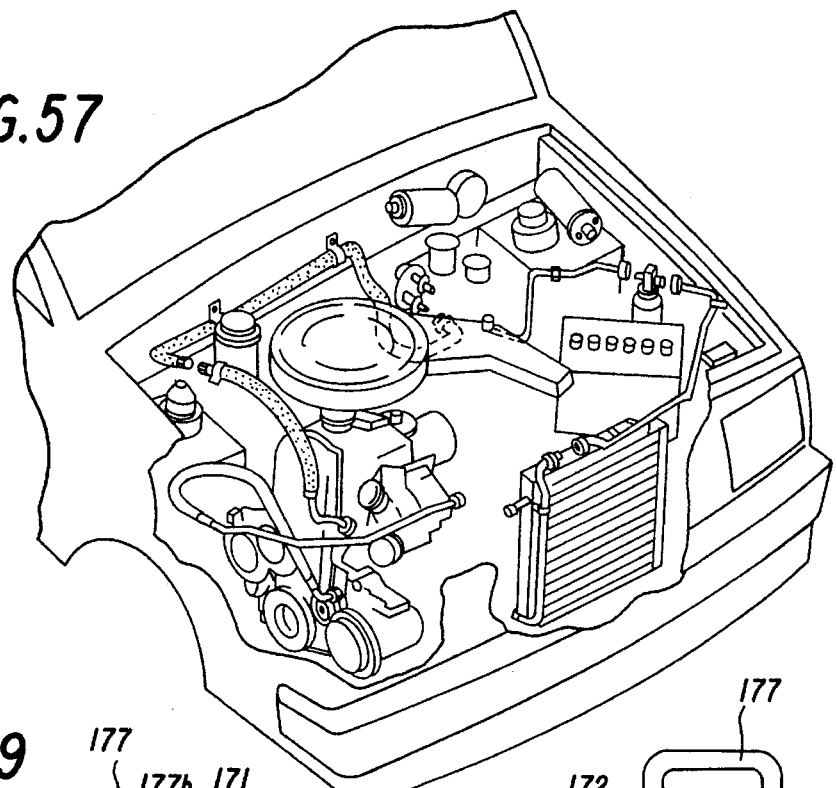
FIG. 57 is a perspective view showing a piping system in the engine room of a motor vehicle.
Figure 59:
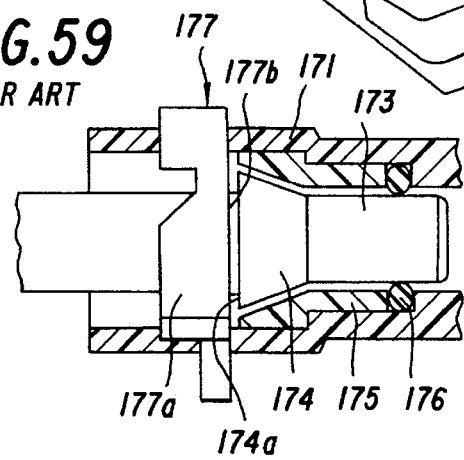
FIG. 59 is a view in longitudinal section of the conventional pipe joint shown in FIG. 58.
Figure 60:
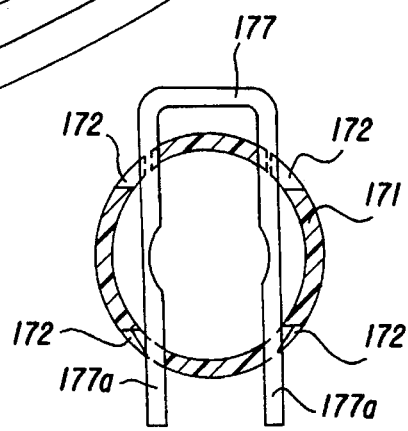
FIG. 60 is a reference view showing a stopper in contact with a housing in the joint shown in FIG. 58.
Figure 58:
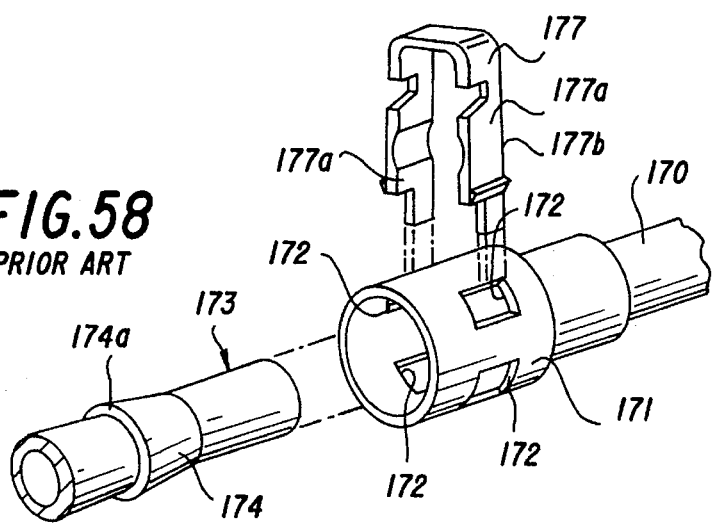
FIG. 58 is an exploded perspective view of a conventional pipe joint.
Figure 61:
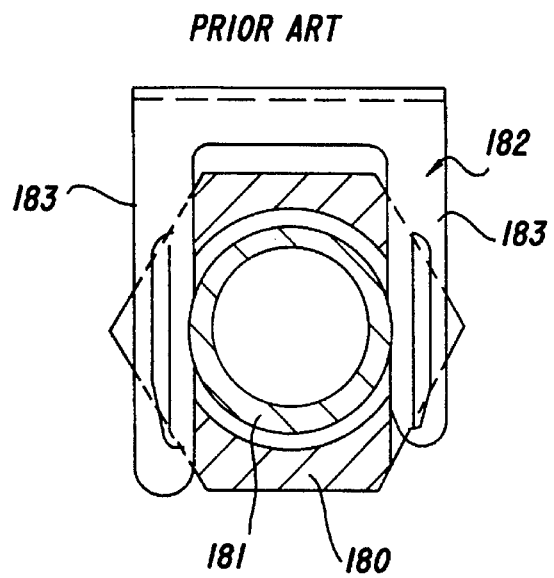
FIG. 61 is a fragmentary view in section showing another conventional example.
Figure 63:
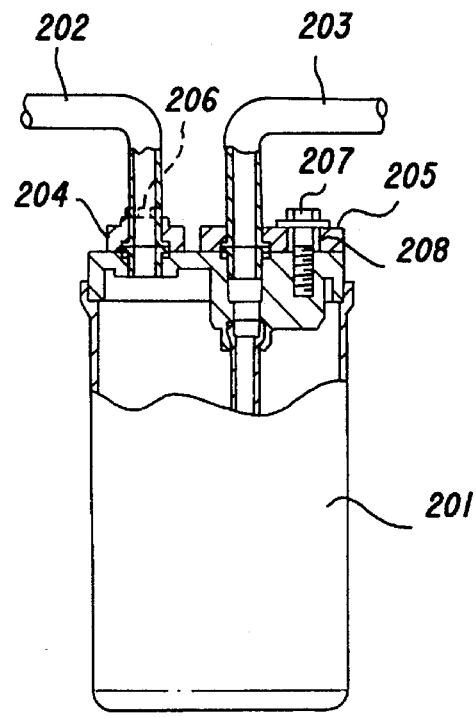
FIG. 63 is a fragmentary view in section showing another conventional example for a receiver.
Figure 62:
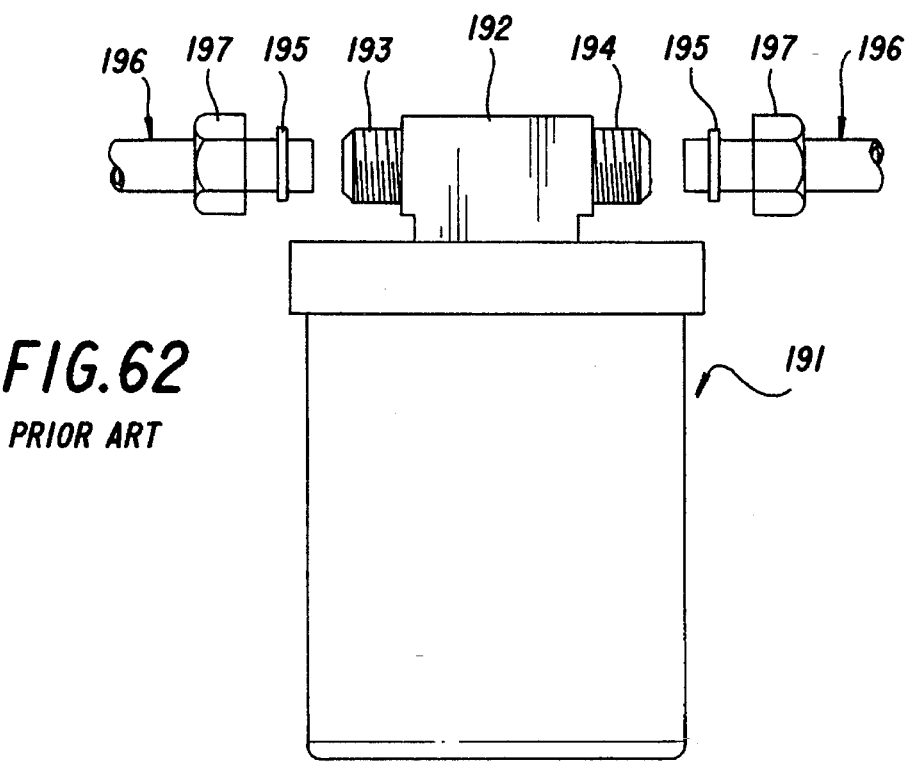
FIG. 62 is an exploded front view showing a conventional example of pipe joint for a receiver.

FIG. 31 shows a modification of the above embodiment. A recess 11a is formed between the inlet portion 112 and the outlet portion 113 at the opposite sides of the head 110a. This gives a lower height to the receiver 110.

FIG. 32 shows another embodiment, in which a liquid inlet portion 112 and a liquid outlet portion 113 are horizontal and each serve as a socket portion 96. Each of pipes 114 is formed at its forward end with a spigot portion 93, which is inserted into the socket portion 96, with a stopper 100 fitted therein. Thus the pipe 114 is joined to the inlet portion (outlet portion).

With the present embodiment, a head 110a and an aspirator pipe 116 are integrally prepared from die-cast aluminum. The integral block is removably liquid-tightly mounted on a tank portion 115 with an O ring 117 interposed therebetween.

FIGS. 33 and 34 show a muffler tank provided between pipes which are included in the piping system of an automotive air conditioner.

This arrangement includes a pipe joint which comprises a hollow cylindrical spigot portion 93 having an annular projection 91 around its outer periphery and an O ring 92 fitted therearound and positioned closer to a forward end thereof than the annular projection 91; a hollow cylindrical socket portion 96 having an inside diameter equal to the outside diameter of the spigot portion 93 and formed with two circumferential apertures 95 in its peripheral wall 94a except at a part of the wall and with a stepped part 94b on the inner surface of the wall 94a for the annular projection 91 of the spigot portion 93 to come into contact with; and a stopper 100 having two circular-arc resilient legs 97 fittable into the respective apertures 95 from outside to project inward, each of the legs having a slanting inner surface extending toward the insertion side of the spigot portion 93, the stopper 100 having a head portion 98 extending between and integral with ends of the legs 97 and a slipping-off preventing engaging portion 9 formed on the inner surface of the base portion of each leg 97. The stopper is made of a resilient material. The spigot portion 93 is provided at each of opposite ends of a muffler tank 101. The socket portion 96 is provided toward each of pipes 102. The apertures 95 and the stepped part 94b are formed at the respective ends of the socket portion 96, one end thereof having the spigot portion 93 of the tank 101 inserted therein. The spigot portion 93 provided at the forward end of the pipe 12 is inserted in the other end. The annular projection 91 of each spigot portion 93 is fixedly held between the stepped part 94b of each socket portion 96 and the legs 97 of the stopper 100 inserted in the apertures 96.

A charge valve 96b for closing a fluid channel 96a is screwed into the socket portion 96 at a location between the apertures 95.

For the replacement of the muffler tank 101, the muffler tank 101 is removable merebly by removing the stoppers 100 close to the ends of the tank 101. A new muffler tank 101 can be installed merely by fitting the stoppers 100 in place and thereafter inserting the spigot portions 93 at opposite ends of the muffler 101 into the socket portions 96 toward the pipes 102. The discharge of the refrigerant can be precluded by turning the charge valves 96b and thereby closing the fluid channel 96a before the replacement of the tank 101. This, the present embodiment assures facilitated replacement of muffler tank 101 with the discharge of refrigerant prevented.

The pipe joint is usable also for a pressure container which comprises a hollow cylindrical tank portion having a bottom, and an adapter closing an upper end opening of the tank portion and having inlet and outlet channels for a fluid. The spigot portion is provided at one of the tank portion upper opening end and an adapter joint end, with the socket portion provided at the other end so as to join these portions with use of the stopper.

Other embodiments of the invention will be described next.

FIGS. 35 to 38 show an embodiment of the invention. The embodiment, i.e., a stopper 122, is shaped asymmetrically with respect to the direction in which circular-arc resilient legs 124 thereof are opposed to each other. At opposite sides of the center of head 126 of the stopper 122, right and left halves thereof, each including a circular-arc resilient leg 124, have different thicknesses t1, t2, respectively. In corresponding relation with this, a pair of apertures 127 formed in a socket portion 121 are so shaped that one of the apertures, 127a, has a large width in conformity with the thick leg 124a, and that the other aperture 127b has a small width in conformity with the thin leg 124b. Only when the stopper 122 is installed in the socket portion 121 with slanting surfaces 128a thereof facing toward the pipe insertion side, the thick leg 124a is fittable in the aperture 127a of large width, and the thin leg 124b in the aperture 127b of small width. Thus the combination of aperture and leg is specified. Accordingly, if the stopper 122 is to be installed as inverted into the socket portion 121, the thick leg 124a will be in combination with the aperture 127b of small width. The stopper 122 is then not fittable properly into the apertures 127. This indicates the wrong orientation of the stopper 122.

FIGS. 39 to 45 show another embodiment of the invention, i.e., a stopper 122, which is asymmetric with respect to the direction of its thickness.

The head 126 of the stopper 122 is formed on the inner surface thereof with right and left two engaging projections 129 over the lower half of the stopper with respect to the direction of its thickness (direction of height of the head). On the other than, a socket portion 121 has a bridge 121a, which is formed with right and left two engaging holes 130 over the lower half thereof with respect to the direction of width (direction of the length of the socket portion, the holes 130 corresponding to the projections 129. Accordingly, when a tapered portion 128a of the stopper 122 is directed toward the pipe insertion side, the engaging projections 129 are snugly fittable into the holes 130 as shown in FIG. 52, permitting the stopper 122 to be properly installed in the socket portion 121. However, when the stopper 122 is inverted, the projections 129 strike against the wall face of the bridge 121a above the holes 130 as shown in FIG. 45. This makes it impossible to further push the stopper 122 into the socket portion 121 radially inwardly thereof and to properly fit the legs 124 into the apertures 127. This indicates the inverted or reversed position of the stopper 122. With this embodiment, the engaging holes 130 are formed in each of two bridges 121a, such that the stopper 122 is installable from the side of either one of the bridges.

FIGS. 46 to 52 show another embodiment, in which an engaging projection 131 having a height equal to the thickness of the stopper is provided on the inner surface of head 126 of the stopper 122 at the right or left side, i.e., at one side with respect to the direction of opposition of the legs 124. On the other hand, the bridge 121a of the socket portion 121 is formed with an engaging hole 132 coinciding with the projection 131 in position when the stopper 122 is fitted in place with the slanting surfaces 128a facing toward the pipe insertion side. Accordingly, when the stopper 122 is positioned with the slanting surfaces 128a thereof facing toward the pipe insertion side, the projection 131 is snugly fittable into the hole 132 as seen in FIG. 51, enabling the stopper 122 to be properly installed into the socket portion 121. In contrast, when the stopper 122 is positioned as inverted or reversed, the projection 131 strikes against the wall face of the bridge 121a of the socket portion 121 as shown in FIG. 52, preventing the insertion of the stopper 122. This indicates the wrong position. As in the above embodiment, the hole 132 is formed in each of the bridges 121a so as to render the stopper 122 installable from either side.

With the embodiments shown in FIGS. 35 to 52, a separate aluminum pipe 125 is inserted into the socket portion 121 and diametrically enlarged in advance for an O ring 133 to be pressed into contact with the inner periphery of end portion of the pipe 125. However, as shown in FIGS. 53 to 56, the O ring 133 on the pipe 123 may be pressed directly against the inner surface of end part of the socket portion 121, with an annular projection 134 of the pipe 123 held between the stopper 122 and the stepped part 121b of the socket portion 121.

With some of the embodiments described, the stopper 122 is asymmetric with respect to one of the direction of thickness of the stopper 122 and the direction in which the legs 124 are opposed to each other, wheres the stopper may be made asymmetric with respect to each of these directions.

The present invention can be embodied variously without departing from the spirit and basic features of the invention. Accordingly, the embodiments herein disclosed are given for illustrative purposes only and should not be construed as being limitative. The scope of the invention is defined by the appended claims rather than by the specification. All the alterations and modifications within the definition and scope of the claims are included in the scope of the invention.

What is claimed is:

1. A structure for joining pipes comprising a first pipe having a spigot portion formed with an annular projection on an outer periphery of a base end thereof, a stopper having a pair of circular-arc resilient legs formed with slanting surfaces for receiving the annular projection of the spigot portion and holding surfaces for fixedly holding the annnular projection, a second pipe having a socket portion having a pair of apertures into which the legs fit to project inward and bridges provided between respective end portions of the pair of apertures, the legs being opposed to each other with inwardly curved surfaces thereon facing each other, a distance between fittable ends of the legs of the stopper being substantially equal to a width of the bridges to that the legs pass the bridges of the socket portion and fit into the apertures of the socket portion to be matched, the annular projection of the spigot portion expanding the legs to be inserted while abutting the slanting surfaces of the legs and the legs contracting behind the annular projection when the stopper is to be installed in the socket portion with the slanting surfaces of the legs facing a pipe insertion side, the annular projection being engaged and held by the holding surfaces of the legs so that the first pipe and the second pipe are joined.

2. A pipe joint as defined in claim 1, wherein the spigot portion has an annular groove formed in its outer periphery and positioned closer to a forward end of the spigot portion than the annular projection, and an O ring fitted in the groove.

3. A structure for preventing inverted installment of a stopper within a pipe joint structure comprising a first pipe having a spigot portion formed with an annular projection on an outer periphery of a base end thereof, a stopper having a plurality of circular-arc resilient legs formed with slanting surfaces for receiving the annular projection of the spigot portion which expands the legs and holding surfaces for fixedly holding the annular projection, after the annular projection passes the legs a second pipe having a socket portion having a plurality of apertures into which the legs fit to project inward, the stopper being shaped asymmetrically with respect to an imaginary plane extending through an axis of the stopper and a center between the ends of the legs, the apertures into which the legs fit as the stopper matches the socket portion being shaped asymmetrically with respect to an imaginary plane extending through an axis of the second pipe and a center between the ends of the legs, the apertures into which the legs fit as the stopper matches the socket portion being shaped asymmetrically with respect to an imaginary plane extending through an axis of the second pipe and a center between the ends of the apertures, the legs matching the apertures so that the legs fit into the apertures and the installation of the stopper is performed when the stopper is to be installed in the socket portion with the slanting surfaces of the legs facing a pipe insertion side, and the legs not matching the apertures so that the engagement is prevented when the stopper is to be installed in the socket portion with the slanting surfaces of the legs facing opposite to a pipe insertion side.

4. A structure as defined in claim 3, wherein the stopper is shaped asymmetrically with respect to the imaginary plane extending through the axis of the stopper and the center between the ends of the legs by means of having different thickness.

5. A structure as defined in claim 3, wherein one of said stopper and said socket portion have an engaging projection and the other of said stopper and said socket portion have an engaging hole to be engaged with said projection, the stopper being shaped asymmetrically with respect to the imaginary plane extending through the axis of the stopper and the center between the ends of the legs by means of one of the engaging projection and the engaging hole.

6. A structure for preventing inverted installment of a stopper within a pipe joint structure comprising a first pipe having a spigot portion formed with an annular projection on an outer periphery of a base end thereof, a stopper having a plurality of circular-arc resilient legs formed with slanting surfaces for receiving the annular projection of the spigot portion which expands the legs and holding surfaces for fixedly holding the annular projection, after the annular projection passes the legs a second pipe having a socket portion having a plurality of apertures into which the legs fit to project inward, an engaging projection being provided on the stopper asymmetrically with respect to an axial direction of the stopper, an engaging hole being provided on the socket portion for receiving the engaging projection and corresponding to the engaging projection so as to be disposed asymmetrically with respect to an axial direction of the second pipe, the engaging projection on the stopper matching the engaging hold on the socket portion and the stopper legs fitting into the apertures of the soocket portion so that the installment of the stopper is performed when the stopper is to be installed in the socket portion with the slanting surfaces of the legs facing a pipe insertion side, and the engaging projection not matching the engaging hole so that engagement is prevented when the stopper is to be installed in the socket portion with the slanting surfaces of the legs facing opposite to a pipe insertion side.

\* \* \* \* \*